US010977384B2

(12) United States Patent
Benaloh et al.

(10) Patent No.: US 10,977,384 B2
(45) Date of Patent: Apr. 13, 2021

(54) HARDWARE PROTECTION FOR DIFFERENTIAL PRIVACY

(71) Applicant: Microsoft Technology Licensing, LLC, Redmond, WA (US)

(72) Inventors: Josh D. Benaloh, Redmond, WA (US); Harsha P. Nori, Bellevue, WA (US); Janardhan Dattatreya Kulkarni, Redmond, WA (US); Joshua Stanley Allen, Bellevue, WA (US); Jacob Rubin Lorch, Bellevue, WA (US); Melissa Erin Chase, Seattle, WA (US); Olga Ohrimenko, Cambridge (GB); Sergey Yekhanin, Redmond, WA (US); Srinath T. V. Setty, Redmond, WA (US); Bolin Ding, Redmond, WA (US)

(73) Assignee: Microsoft Technoogy Licensing, LLC, Redmond, WA (US)

( * ) Notice: Subject to any disclaimer, the term of this patent is extended or adjusted under 35 U.S.C. 154(b) by 385 days.

(21) Appl. No.: 15/815,593

(22) Filed: Nov. 16, 2017

(65) Prior Publication Data

US 2019/0147188 A1 May 16, 2019

(51) Int. Cl.
*G06F 21/62* (2013.01)
*G06F 21/60* (2013.01)
(Continued)

(52) U.S. Cl.
CPC .......... *G06F 21/6254* (2013.01); *G06F 21/53* (2013.01); *G06F 21/602* (2013.01);
(Continued)

(58) Field of Classification Search
CPC .. G06F 21/6254; G06F 21/6245; G06F 21/53; G06F 21/602; G06F 21/78; G06F 2221/2107; G06F 2221/214; G06F 3/0652; H04L 9/0897; H04L 9/3239; H04L 9/3263; H04L 63/00; H04L 63/045;
(Continued)

(56) References Cited

U.S. PATENT DOCUMENTS 6,317,468 B1    11/2001  Meyer
8,316,237 B1 *  11/2012  Felsher ................. H04L 9/0825
                                                380/282
(Continued)

OTHER PUBLICATIONS

Kato Mivule, "Utilizing Noise Addition for Data Privacy, an Overview", Sep. 16, 2013, Proceedings of the International Conference on Information and Knowledge Engineering (IKE 2012), p. 65-71. (Year: 2013).*

(Continued)

*Primary Examiner* — Nelson S. Giddins
(74) *Attorney, Agent, or Firm* — Rainier Patents, P.S.

(57) ABSTRACT

This document relates to hardware protection of differential privacy techniques. One example obtains multiple instances of encrypted telemetry data within a secure enclave and processes the encrypted telemetry data to obtain multiple instances of unencrypted telemetry data. The example also processes, within the secure enclave, the multiple instances of unencrypted telemetry data to obtain a perturbed aggregate. The example also releases the perturbed aggregate from the secure enclave.

20 Claims, 12 Drawing Sheets

(51) Int. Cl.

| | |
|---|---|
| *G06F 21/53* | (2013.01) |
| *G06F 21/78* | (2013.01) |
| *H04L 9/32* | (2006.01) |
| *H04L 29/06* | (2006.01) |
| *H04L 9/08* | (2006.01) |

(52) U.S. Cl.
CPC ........ *G06F 21/6245* (2013.01); *H04L 9/0897* (2013.01); *H04L 9/3239* (2013.01); *H04L 9/3263* (2013.01); *H04L 63/00* (2013.01); *G06F 21/78* (2013.01); *G06F 2221/2107* (2013.01); *H04L 2209/08* (2013.01); *H04L 2209/38* (2013.01)

(58) Field of Classification Search
CPC ............. H04L 63/0442; H04L 2209/38; H04L 2209/08; G06N 3/02
See application file for complete search history.

(56) References Cited

U.S. PATENT DOCUMENTS

| | | | |
|---|---|---|---|
| 9,363,087 B2 | 6/2016 | Hawblitzel et al. | |
| 9,536,093 B2 | 1/2017 | Hawblitzel et al. | |
| 10,504,154 B1 | 12/2019 | Bonawitz et al. | |
| 2009/0300312 A1* | 12/2009 | Handschuh | G06F 12/1408 |
| | | | 711/166 |
| 2011/0007639 A1 | 1/2011 | Richardson | |
| 2015/0058077 A1 | 2/2015 | Buban et al. | |
| 2016/0171248 A1* | 6/2016 | Nesher | G06F 21/53 |
| | | | 713/190 |
| 2017/0353855 A1 | 12/2017 | Joy | |
| 2018/0255023 A1* | 9/2018 | Whaley | H04L 63/0421 |
| 2018/0307854 A1* | 10/2018 | Bernau | G06Q 40/12 |
| 2018/0336357 A1 | 11/2018 | Nissim Kobliner et al. | |
| 2019/0073608 A1* | 3/2019 | Veeningen | G06F 16/285 |
| 2019/0141052 A1* | 5/2019 | Nerurkar | G06F 21/6218 |
| 2019/0236306 A1 | 8/2019 | Ding et al. | |

OTHER PUBLICATIONS

Bassily, et al., "Practical Locally Private Heavy Hitters", In Journal of Computing Research Repository, Jul. 2017, pp. 1-32.
Bittau, et al., "PROCHLO: Strong Privacy for Analytics in the Crowd", In Proceedings of the 26th Symposium on Operating Systems Principles, Oct. 28, 2017, pp. 1-19.
Costan, et al., "Intel SGX Explained", In IACR Cryptology ePrint Archive, vol. 86, Feb. 20, 2016, pp. 1-118.
Dwork, et al., "The Algorithmic Foundations of Differential Privacy", In Foundations and Trends in Theoretical Computer Science, vol. 9, No. 3-4, Aug. 11, 2014, 26 Pages.
Erlingsson, et al., "RAPPOR: Randomized Aggregatable Privacy-Preserving Ordinal Response", In Proceedings of the ACM SIGSAC Conference on Computer and Communications Security, Nov. 3, 2014, pp. 1054-1067.
Hardt, et al., "A Multiplicative Weights Mechanism for Privacy-Preserving Data Analysis", In Proceedings of 51st Annual IEEE Symposium on Foundations of Computer Science, Oct. 23, 2010, pp. 1-28.
Tang, et al., "Privacy Loss in Apple's Implementation of Differential Privacy on MacOS 10.12", In Journal of Computing Research Repository, vol. 1709, Sep. 2017, 12 Pages.
Matetic et al., "ROTE: Rollback Protection for Trusted Execution," USENIX 26th Security Symposium, Aug. 16-18, 2017, pp. 1289-1306.
Hawblitzel et al., "Ironclad Apps: End-to-End Security via Automated Full-System Verification," OSDI, Oct. 6, 2014, vol. 14, pp. 165-181.
Ding et al., "Collecting Telemetry Data Privately," Advances in Neural Information Processing Systems 2017, pp. 3574-3583.
Sarmenta et al., "Virtual Monotonic Counters and Count-limited Objects Using a TPM Without a Trusted OS," ACM, Proceedings of the First ACM Workshop on Scalable Trusted Computing, Nov. 3, 2006, pp. 27-42.
Setty et al., Enabling Secure and Resource-Efficient Blockchain Networks with VOLT, retrieved at: <<https://www.microsoft.com/en-us/research/wp-content/uploads/2017/08/volt.pdf>> on Aug. 8, 2017.
Wikipedia, "Differential Privacy," accessed via the internet archive at <<https://web.archive.org/web/20170928131556/https://en.wikipedia.org/wiki/Differential_privacy>> on Sep. 28, 2017, 5 pages.
Wikipedia, "Software Guard Extensions," accessed via the internet archive at <<https://web.archive.org/web/20170922045947/https://en.wikipedia.org/wiki/Software_Guard_Extensions>> on Sep. 22, 2017, 2 pages.
Intel Developer Zone, "Intel Software Guard Extensions (Intel SGX)," accessed via the internet archive at <<https://web.archive.org/web/20171008192641/https://software.intel.com/en-us/sgx>> on Oct. 8, 2017, 4 pages.
Intel Developer Zone, Intel Software Guard Extensions Remote Attestation End-to-End Example, retrieved at <<https://software.intel.com/en-us/articles/intel-software-guard-extensions-remote-attestation-end-to-end-example>>, published on Jul. 8, 2016, 13 pages.
Intel Developer Zone, "Cryptographic Library," accessed via the internet archive at <<https://web.archive.org/web/20170901013316/https://software.intel.com/en-us/node/709061>> on Sep. 1, 2017, 2 pages.
Intel Developer Zone, "Trusted Key Exchange Functions," accessed via the internet archive at <<https://web.archive.org/web/20170911213919/https://softwaraintel.com/en-us/node/709062>> on Sep. 11, 2017, 1 page.
"A/B Testing What is A/B Testing? How A/B Testing Works", Retrieved From: https://web.archive.org/web/20171116021515/https://www.optimizely.com/optimization-glossarylab-testing/, Nov. 16, 2017, 9 Pages.
"What's New in iOS", Retrieved from: https://developerapple.com/library/content/releasenotes/General/WhatsNewIniOS/Articies/iOS10.html, Juiy 10, 2017, 12 Pages.
Agrawal, et al., "A framework for highaccuracy privacy-preserving mining", In Proceedings of the 21st International Conference on Data Engineering, Apr. 5, 2005, 14 Pages.
Avent, et al., "BLENDER: Enabling Local Search with a Hybrid Differential Privacy Model", In Proceedings of the 26th USENIX Security Symposium, Aug. 16, 2017, pp. 747-764.
Bassily, et al., "Local, Private, Efficient Protocols for Succinct Histograms", In Proceedings of the 47th ACM Symposium on Theory of Computing, Jun. 14, 2015, pp. 127-135.
Ding, et al., "Comparing Population Means under Local Differential Privacy: with Significance and Power", In Proceedings of the Thirty-Second AAAI Conference on Artificial Intelligence, Mar. 24, 2016, 8 Pages.
Duchi, et al., "Locai Privacy and Minimax Bounds: Sharp Rates for Probability Estimation", In Proceedings of the Advances in Neural information Processing Systems, Dec. 5, 2013, 9 Pages.
Duchi, et al., "Local Privacy and Statistical Minimax Rates", In Proceedings of the 54th Annual IEEE Symposium on Foundations of Computer Science, Oct. 26, 2013, 10 Pages.
Duchi, et al., "Minimax Optimal Procedures for Locally Rrivate Estimation", In Journal of Computing Research Repository, Apr. 2016, 64 Pages.
Dwork, et al., "Calibrating Noise to Sensitivity in Private Data Analysis", In Proceedings of the Third Conference on Theory of Cryptography, Mar. 4, 2006, 20 Pages.
Evfimievski, et al., "Limiting Privacy Breaches in Privacy Preserving Data Mining", In Proceedings of the 22nd ACM Symposium on Principles of Database Systems, Jun. 9, 2003, 12 Pages.
Fanti, et al., "Building a RAPPOR with the Unknown: Privacy-Preserving Learning of Associations and Data Dictionaries", In Proceesings of the Privacy Enhancing Technologies, vol. 3, Jul. 1, 2016, 21 Pages.

(56) References Cited

OTHER PUBLICATIONS

Feinberg, et al., "Differential Privacy and the Risk-Utility Tradeoff for Multi-dimensional Contingency Tables,", In Proceedings of the Privacy in Statistical Databases, Sep. 22, 2010, pp. 187-199.
Gaboardi, et al., "Differentially Private Chi-Squared Hypothesis Testing: Goodness of Fit and Independence Testing", In Proceedings of the 33rd International Confernece on Machine Learning, vol. 48, Jun. 19, 2016, 10 Pages.
Greenberg, Andy, "Uber's New Tool Lets Its Staff Know Less About You", Retrieved from: https://www.wired.com/story/uber-privacy-elastic-sensitivity/, Jul. 13, 2017, 7 Pages.
Hackett, Robert, "What to know about the Ashley Madison hack", Retrieved from: http://fortune.com/2015/08/26/ashley-madison-hack/, Aug. 26, 2015, 4 Pages.
Johnson, et al., "Privacy-Preserving Data Expoloration in Genome-Wide Association Studies", In Proceedings of the 19th ACM SIGKDD International Conference on Knowledge Discovery and Data Mining, Aug. 11, 2013, pp.0 1079-1087.
Kairouz, et al., "Discrete Distribution Estimation Under Loal Privacy", In Proceedings of the 33rd Internaitonal Conference on Machine Learning, Jun. 19, 2016, 27 Pages.
Kairouz, et al., "External Mechanisms for Local Differerntial Privacy", In Proceedings of the Advances in Neural Information Processing Systems, Dec. 8, 2014, 9 Pages.
Kakizaki, et al., "Differentially Private Chi-squared Test by Unit Circle Mechanism", In Proceedings of the 34th International Conference on Machine Learning, Aug. 6, 2017, 10 Pages.
Karwa, et al. "Differentially private graphical degree sequences and synthetic graphs", In Proceedings of the Privacy in Statistical Databases, Sep. 26, 2012, 18 Pages.
Karwa, et al., "Inference Using Noisy Degrees: Differentially Private-model and Synthetic Graphs", In Journal of the Annals of Statistics, vol. 44, Issue 1, 2016, pp. 87-112.
Kohavi, et al., "Front Line Internet Analytics at Amazon.com", In Emetrics Summit, Jun. 2004, 31 Pages.
Kohavi, et al., "Trustworthy Online Controlled Experiments: Five Puzzling Outcomes Explained", In Proceesings of the 18th ACM SIGKDD International Conference on Knowledge Discovery and Data Mining, Aug. 12, 2012, pp. 786-794.
McSherry, Frank, "Privacy Integrated Queries: An Extensible Platform for Privacy-Preserving Data Anaylysi", In Proceedings of the ACM SIGMOD International Conference on Management of data, Jun. 29, 2009, pp. 19-30.

Panger, Galen, "Reassessing the Facebook Experiment: Critical Thinking about the Validity of Big Data Research", In Journal of Information Communication and Society, Oct. 19, 2015, 38 Pages.
"International Search Report and Written Opinion issued in PCT Application No. PCT/US2019/013884", dated Apr. 5, 2019, 14 Pages.
Rogers, et al., "A New Class of Private Chi-Square Tests", In Proceedings of the 20th International Conference on Artificial Intelligence and Statistics, Apr. 10, 2017, 10 Pages.
Rogers, Ryan Michael., "Leveraging Privacy in Data Analysis", A Dissertation Submitted for the Partial Fulfillment fo the Requirements for the Degree of Doctor of Philosophy in Applied Mathematics and Computational Science University of Pennsylvania, 2017, 232 Pages.
Solea, Eftychia, "Differentially private hypothesis testing for normanl random variables", A Thesis Submitted for the Partial Fulfillment of the Requirements for the Degree of Masters of Science, The Pennsylvania State University, May 2014, 171 Pages.
Tnag, et al., "Overlapping Experiment Infrastructure: More, Better, Faster Experimentation", In Proceedings of the 16th ACM SIGKDD International Conference on Knowledge Discovery and Data Mining, Jul. 25, 2010, 10 Pages.
Uhler, et al., "Privacy-preserving Data Sharing for Genome-wide Association Studies", In Journal of Privacy and Confidentiality, vol. 5, Issue 1, 2013, pp. 137-166.
Vu, et al., "Differential Privacy for Clinical Trial Data: Preliminary Evaluations", In Proceedings of the IEEE International Conference on Data Mining Workshops, Dec. 6, 2009, 6 Pages.
Wang, et al., "Differentially Private Hypothesis Testing, Revisited", In Journal of Computing Research Repository, Nov. 2015, 11 Pages.
Wang, et al., "Locally Differentially Private Protocols for Frequency Estimation", In Proceedings of the 26th USENIX Security Symposium, Aug. 2017, pp. 729-745.
Wang, et al., "Mutual Information Optimally Local Private Discrete Distribution Estimation", In Proceedings of the 29the Conference on Neural Information Processing Systems, Jul. 2016, 12 Pages.
Wang, et al., "Using Randomized Response for Differential Privacy Preserving Data Collection", In Proceedings of the Workshops on the EDBT/ICDT, vol. 1558, Mar. 15, 2016, 8 Pages.
Warner, Stanley L., "Randomized Response: A Survey Technique for Eliminating Evasive Answer Bias", In Journal of the American Statistical Association, vol. 60, Issue 309, Mar. 1965, pp. 53-60.
Yu, et al., "Scalable Privacy-Preserving Data Sharing Methodology for Genome-Wide Association Studies", In Journal of Biomedical informatics, vol. 50, Aug. 2014, 26 Pages.
"Non Final Office Action Issued in U.S. Appl. No. 15/928,935", dated Mar. 6, 2020, 14 Pages.

\* cited by examiner

PRIVACY CONFIGURATION GUI 1000

| TELEMETRY DATA TYPE 1002 | PRIVACY LEVEL 1004 |
|---|---|
| Service Packs | Low |
| Drivers | Medium |
| Browser App Usage | High |
| Email App Usage | Unshared |
| Memory Utilization | Medium |
| Processor Utilization | Medium |

FIG. 10

Service Pack Data Table 1100

| Record Number 1102 | Service Pack Installed 1104 | Privacy Level 1106 | Perturbed Aggregate 1108 |
|---|---|---|---|
| 1 | No | Med | 52.40% |
| 2 | No | Med | |
| 3 | Yes | Med | |
| 4 | Yes | Med | |
| 5 | Yes | Med | |
| 6 | No | Med | |
| 7 | No | Med | |
| 8 | Yes | Med | |
| 9 | Yes | Med | |
| 10 | Yes | Med | |
| 11 | No | Med | |
| 12 | No | Med | |

FIG. 11

Service Pack Data Table 1200

| Record Number 1102 | Service Pack Installed 1104 | Privacy Level 1106 | Perturbed Aggregate 1108 |
|---|---|---|---|
| 1 | No | Low | 50.70% |
| 2 | No | Low | |
| 3 | Yes | Low | |
| 4 | Yes | Low | |
| 5 | Yes | Med | 53.70% |
| 6 | No | Med | |
| 7 | No | Med | |
| 8 | Yes | Med | |
| 9 | Yes | High | 54.80% |
| 10 | Yes | High | |
| 11 | No | High | |
| 12 | No | High | |

FIG. 12

HARDWARE PROTECTION FOR DIFFERENTIAL PRIVACY

BACKGROUND

Some types of equipment collect telemetry data and communicate the telemetry data for further processing. Various organizations are interested in analyzing the telemetry data, because the telemetry data can reveal broader trends in how the equipment is being used. However, often the telemetry data is owned by various users who do not necessarily trust the organization that would like to perform the analysis. One broad approach is to allow organizations to learn aggregate statistical information about the telemetry data (e.g., an average, median, etc.) without giving those organizations the raw telemetry data. However, knowledge of the aggregate statistics can still allow untrusted entities to derive the telemetry data submitted by specific users, which is a significant privacy concern. As a consequence, users may be reluctant to share their telemetry data with other entities.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for performing differential privacy processing in protected hardware. One example includes a method or technique that can be performed on a computing device. The method can include obtaining encrypted telemetry data and processing the encrypted telemetry data within a secure enclave to obtain unencrypted telemetry data. The method can also include processing, within the secure enclave, the unencrypted telemetry data to obtain a perturbed aggregate, and releasing the perturbed aggregate from the secure enclave.

Another example includes a system that includes a hardware processing unit and storage resources including a memory device. The storage resources can store computer-readable instructions which, when executed by the hardware processing unit, cause the hardware processing unit to request allocation of a secure enclave comprising a secure memory region on the memory device, and to load an enclave executable into the secure memory region. The enclave executable can include differential privacy code. The computer-readable instructions can also cause the hardware processing unit to securely process multiple instances of telemetry data in the secure enclave using the differential privacy code to obtain a result, and to release the result from the secure enclave.

Another example includes a computing device having a memory device configured to provide a secure memory region and a hardware processing unit. The hardware processing unit can be configured to process telemetry data within the secure memory region using differential privacy code. The differential privacy code can produce a perturbed result. The hardware processing unit can also be configured to release the perturbed result from the secure memory region to another region of memory on the memory device, and cause the telemetry data to be deleted from the secure memory region.

The above listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIG. 10 illustrates an exemplary graphical user interface, consistent with some implementations of the present concepts.

FIGS. 11 and 12 illustrate example data tables, consistent with some implementations of the present concepts.

DETAILED DESCRIPTION

Overview

Figure 1:
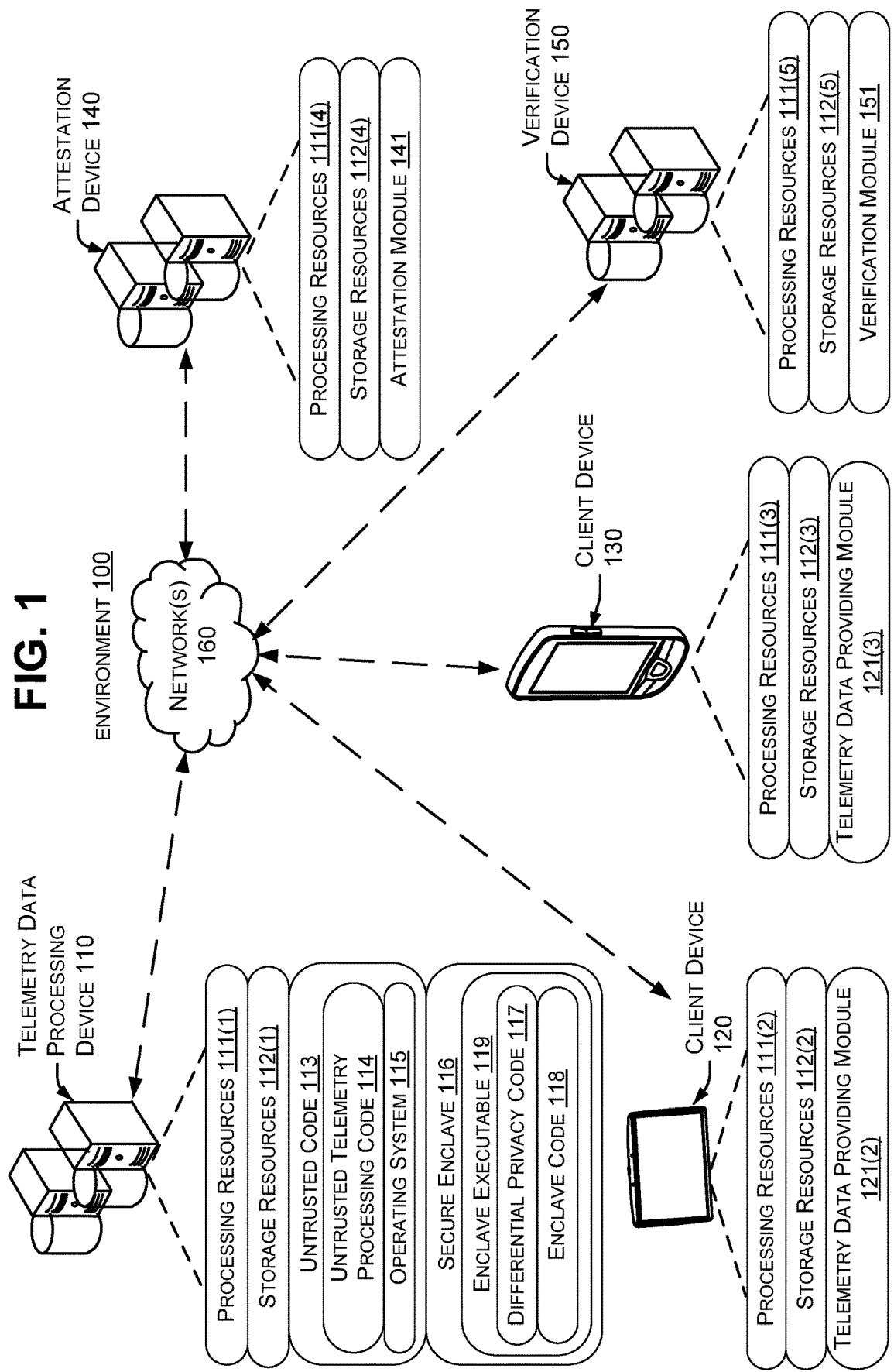
FIG. 1 illustrates an example environment, consistent with some implementations of the present concepts.

One high-level approach for preventing the disclosure of private telemetry data involves adding noise to information computed using the private telemetry data. The addition of noise prevents adversaries from learning the actual private telemetry values provided by specific users. If the amount of added noise is not too great, then information derived from telemetry data provided over a large population of sources (e.g., users, computing devices, other equipment) can still be useful for understanding trends in the population. This approach can broadly be referred to as "differential privacy."

One form of differential privacy involves the users or their devices individually adding noise to their telemetry data before providing the data to an entity that calculates aggregates over the noisy input data. Because the noise is added locally by the user or the user's device before the aggregates are computed, the users are not necessarily releasing their actual private data. This approach is referred to as "local" differential privacy. As a simple example, consider a population of users where each user has either the value of 0 or 1 for a specific bit. Assume users with an actual value of 0 for the bit are instructed to report a value of 0 with 75% probability and a value of 1 with 25% probability. Also, assume that users with an actual value of 1 for the bit are instructed to report a value of 1 with 75% probability and a value of 0 with 25% probability. In this case, if every user has a value of 1, we expect that 75% of users report a value of 1. However, we do not know whether any specific user has an actual value of 0 or 1, since we do not know whether they reported their true value.

Local differential privacy is beneficial in instances where the individual users do not want the receiving entity to know their specific private telemetry values. However, because the noise is added by the users themselves before any aggregate information is computed, the technique has some drawbacks. If the users add a lot of noise, then the technique provides a relatively strong privacy guarantee. However, aggregates computed from the extremely noisy data may be noisy themselves, and thus may not provide much useful information about the underlying distribution of telemetry values. On the other hand, if the users add relatively little noise, then the aggregate information is more likely to reflect the underlying distribution, but users have a much less robust privacy guarantee.

Another differential privacy technique is referred to as "global differential privacy." In global differential privacy, users accurately report their values to a trusted entity. Then, the trusted entity computes aggregate information from the actual values and adds noise to the computed information. The aggregate information obtained using global differential privacy is generally more accurate than would be the case if the users added noise, as in the local differential privacy approach. However, global differential privacy techniques generally involve users sharing their actual private telemetry values with the trusted entity, and some users may not wish to reveal their actual telemetry values to another entity.

Now, consider an entity with a large population of users that would like to obtain some aggregate information about the users, while still providing strong privacy guarantees to encourage the users to share their data. Such an entity can use a local differential privacy scheme, but they will suffer the privacy and/or accuracy drawbacks mentioned above. The entity can use a global differential privacy algorithm instead, but this would typically involve the users sharing their actual private telemetry values with the entity. The users have no way of knowing whether the entity will only perform the global differential privacy algorithm on their data, or if perhaps the entity will use the data for other purposes to which the users have not agreed.

The present implementations can overcome these privacy concerns by executing global differential privacy algorithms on private telemetry data using trusted hardware. The basic idea is that the private telemetry data is provided to the entity in encrypted form, and the entity processes the private telemetry data using code executing on the trusted hardware. The trusted hardware can store a private key for decrypting the private telemetry data, and process the private telemetry data internally to calculate some aggregate. The trusted hardware can also add statistical noise to the aggregate to obtain a perturbed aggregate, and release the perturbed aggregate outside of the trusted hardware to the entity.

The trusted hardware is selected so that the entity cannot retrieve the actual values of the telemetry input data from the trusted hardware. As a consequence, the entity only learns the perturbed aggregate produced by the code executing in the trusted hardware, and not the actual private telemetry data provided by the users. Moreover, as discussed more below, the trusted hardware can also provide some guarantees that the code executing on the trusted hardware has not been modified.

One type of trusted hardware can provide a construct that is referred to herein as a "secure enclave." A secure enclave can execute a process in a secure memory region that is physically protected from external access by other processes on the device. In some cases, secure enclaves can also be associated with a library of enclave code that performs various requested functions or services for user code, such as differential privacy code, executing in the secure enclave. A secure enclave can also be supported by a processing unit that causes communications to the secure memory region to be encrypted on a memory bus. The processing unit can also provide data sealing and unsealing functionality, as discussed elsewhere herein. For example, Intel® SGX technology can provide secure enclaves, libraries, and data sealing/unsealing functionality that is suitable for implementing the techniques disclosed herein.

By using trusted hardware to perform differential privacy processing, the present implementations provide privacy benefits similar or superior to those provided by local differential privacy algorithms, while also obtaining high-quality aggregate information by using global differential privacy algorithms.

Cloud Scenario

The present implementations can be performed in various scenarios on various devices. FIG. 1 shows an example environment 100 in which the present implementations can be employed using one or more services connected to various client devices, as discussed more below. Note, however, that other technologies can be used, e.g., peer-to-peer, grid computing, etc.

As shown in FIG. 1, environment 100 includes a telemetry data processing device 110, a tablet client device 120, a mobile phone client device 130, an attestation device 140, and a verification device 150 connected by one or more networks 160. Note that the client devices can be embodied both as mobile devices as shown in FIG. 1, as well as stationary devices such as desktops, server devices, etc. Likewise, the telemetry data processing device, the attestation device, and/or the verification device can be implemented using various types of computing devices including servers, mobile devices, etc. In some cases, any of the devices shown in FIG. 1, but particularly devices 110, 140, and/or 150, can be implemented in data centers, server farms, etc.

Certain components of the devices shown in FIG. 1 may be referred to herein by parenthetical reference numbers. For the purposes of the following description, the parenthetical (1) indicates an occurrence of a given component on the telemetry data processing device 110, (2) indicates an occurrence of a given component on the client device 120, (3) indicates an occurrence on the client device 130, (4) indicates an occurrence on the attestation device 140, and (5) indicates an occurrence on the verification device 150. Unless identifying a specific instance of a given component, this document will refer generally to the components without the parenthetical.

Generally, the devices 110, 120, 130, 140, and/or 150 may have respective processing resources 111 and storage resources 112, which are discussed in more detail below. The devices may also have various modules that function using the processing and storage resources to perform the techniques discussed herein, as discussed more below. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Telemetry data processing device 110 may include untrusted code 113. For example, the untrusted code can be any code with which the users of the client devices 120 and/or 130 do not wish to share their private telemetry values. In some cases, the untrusted code can include untrusted telemetry processing code 114 and an operating system 115. The untrusted telemetry processing code can request that the operating system set up a secure enclave 116 by allocating secure memory in which to execute differential privacy code 117 and enclave code 118. The differential privacy code and enclave code can be linked together in an enclave executable 119. The differential privacy code can include calls to library routines provided in the enclave code, e.g., in a library provided by the manufacturer of the trusted hardware. The untrusted telemetry processing code can then load the enclave executable into the secure enclave. The enclave executable can securely process the telemetry data in the secure enclave, and release results from the secure enclave.

As noted above, the enclave code 118 can include various supporting routines provided in a library. As discussed more below, the enclave code can provide one or more routines to establish a public/private key pair, to generate a digital certificate, to perform encryption or decryption of data, to seal and unseal data across enclave instances, etc. In some cases, the differential privacy code 117 is compiled and statically linked to particular routines in the enclave code to obtain the enclave executable 119. The enclave executable can run as a single process within the secure enclave 116.

The processing resources 111(1) may provide specific machine instructions that designate a region of memory as secure (e.g., protected from other processes), and the operating system 115 may execute these instructions to create the secure enclave 116 within the secure memory. The processing resources may provide the secure memory region using special hardware that protects the secure memory region from being read by other processes executing on the processing resources, including processes with higher levels of privilege than the secure enclave (e.g., the operating system and/or a hypervisor, a driver process, etc.). The memory device in which the secure memory region resides may also physically protect the secure memory region by providing tamper resistance to physical attacks, such as memory probes. In some cases, the processing resources implement one or more secure, encrypted buses between the processing resources, the memory, and/or storage resources. For example, one or more encrypted memory buses may be provided for communicating data from the processing devices to a memory and/or persistent storage device. In some cases, communications to/from the processing resources and the secure memory region are encrypted, and communications between the processing resources and one or more unprotected memory regions are unencrypted.

The client devices 120 and 130 may have corresponding instances of a telemetry data providing module 121. For example, the telemetry data providing module may communicate telemetry data from the respective client device to the telemetry data processing device 110. The telemetry data providing module can take some steps to ensure privacy before doing so. For example, the telemetry data providing module can encrypt the telemetry data with a public encryption key provided by the secure enclave 116, as discussed more below.

The telemetry data providing module 121 can also request that attestation module 141 on attestation device 140 provide some guarantees that the enclave executable 119, and in particular the differential privacy code 117, has not been modified and is executing within a valid secure enclave 116. For example, the enclave code 118 can cause the secure enclave to provide a digital certificate to the telemetry data providing module, and the telemetry data providing module can forward the certificate to the attestation module for verification. The telemetry data providing module may provide encrypted telemetry data to the telemetry data processing device 110 only after being assured by the attestation module that the differential privacy code is trusted and executing within a valid secure enclave.

The telemetry data providing module 121 can also take steps to ensure that the differential privacy code 117 provides certain privacy guarantees. For example, the telemetry data providing module can contact the verification device 150 to request that the verification device confirm these privacy guarantees. The verification module 151 can obtain a copy of the enclave executable 119, the differential privacy code 117, and/or the enclave code 118 for analysis. For example, the verification module can analyze one or more executions of the enclave executable and/or evaluate the differential privacy code and enclave code in source or binary form. The verification module can confirm that the enclave executable does not reveal the private telemetry data that it processes, that it does not reveal unperturbed aggregates, and/or that it does not otherwise reveal information that would allow an adversary to directly discover or infer the private telemetry data of a given user. The telemetry data providing module may provide encrypted telemetry data to the telemetry data processing device 110 only after being assured by the verification module that the enclave executable provides these guarantees. Also, note that some implementations may provide the verification module on the client device, e.g., as a trusted application that performs the verification functionality discussed herein locally rather than on a remote server.

For the purposes of this document, the term "secure memory region" refers to a region of memory that is protected from external access, e.g., by encryption, physical tamper-resistance, etc. The term "secure enclave" refers to a secure processing environment that can include a secure memory region as well as various supporting functionality, such as an encrypted memory bus, specific processor instructions that can be called to create and close down a secure enclave, data sealing and unsealing functionality, etc. The term "enclave executable" refers to a binary executable file executing within a process in a secure enclave. The term "differential privacy code" generally refers to code that performs differential privacy processing, as discussed elsewhere herein. The term "enclave code" refers to code that performs other functionality within a secure enclave, e.g., when requested to do so by the differential privacy code.

In some instances herein, the term "enclave executable" is used to generally refer to functionality performed by differential processing code and/or enclave code within the enclave executable. In other instances, this document differentiates between specific processing performed by the differential privacy code and specific processing performed by the enclave code. Note also that any functionality performed by the differential processing code or the enclave code is performed by the enclave executable.

First Method

Figure 2:
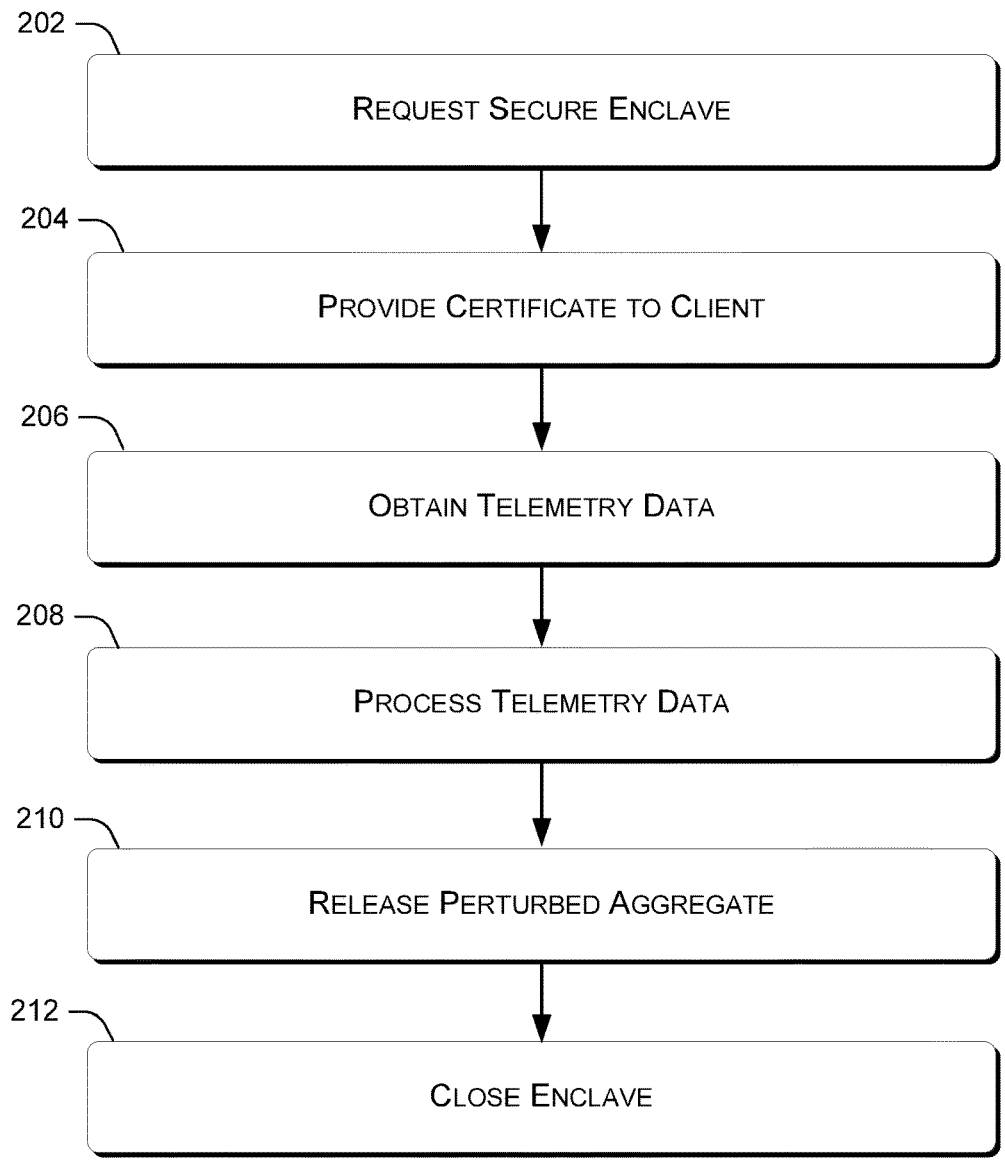
FIGS. 2, 4, 6, and 8 illustrate example methods or techniques, consistent with some implementations of the present concepts.

The following discussion presents an overview of functionality that can allow global differential privacy algorithms to operate on telemetry data in trusted hardware. FIG. 2 illustrates an exemplary method 200, consistent with the present concepts. As discussed more below, method 200 can be implemented by telemetry data processing device 110, shown in FIG. 1. More generally, the method can be implemented on many different types of devices, e.g., by one or more cloud servers, by a client device such as a laptop, tablet, or smartphone, or by combinations of one or more servers, client devices, etc. In one specific scenario, a server device performs method 200 to process telemetry data obtained from multiple client devices such as a mobile phone, laptop, or tablet. In other scenarios, the method can be performed in a distributed fashion, in a peer-to-peer fashion on client devices, etc.

Method 200 begins at block 202, where a secure enclave is requested. For example, the untrusted telemetry processing code 114 can request that the operating system 115 set up the secure enclave 116. The operating system may provide one or more application programming interfaces (APIs) that are called by the untrusted telemetry processing code, e.g., specifying how much secure memory to allocate, specific code to load into the secure memory (e.g., the enclave executable 119), etc. In other implementations, the untrusted telemetry processing code may not call the operating system APIs and instead may directly execute specific machine instructions that instruct the processing resources 111(1) and/or storage resources 112(1) to provide the secure enclave, without assistance from the operating system.

Method 200 continues at block 204, where a certificate is provided to one or more client device(s). For example, the enclave code 118 can send a certificate to the client devices 120 and/or 130, e.g., when the secure enclave 116 is initialized and/or in response to a call from the differential privacy code 117. In some implementations, the untrusted telemetry processing code 114 can specify which client devices are to receive the certificate, and in other cases this can be specified by a configuration file, by the differential privacy code 117 executing in the secure enclave, etc. The certificate demonstrates that the enclave executable has not been altered and is executing in a valid secure enclave, as discussed more below.

The certificate provided to the client device(s) at block 204 can also include an encryption key. For example, the enclave code 118 can perform a local asymmetric key generation algorithm to generate a private key and corresponding public key, e.g., in response to a call from the differential privacy code 117. The enclave code can send the public key to the client devices 120 and/or 130 while retaining the private key within the secure memory region of the secure enclave.

Method 200 continues to block 206, where the enclave executable 119 obtains multiple instances of encrypted telemetry data from the client device(s) and processes them to obtain multiple instances of decrypted telemetry data. In some cases, the processing involves the differential privacy code 117 making a call to the enclave code 118 requesting decryption of the encrypted telemetry data. The enclave code can then decrypt the telemetry data with the decryption key, and provide the unencrypted telemetry data to the differential privacy code. The unencrypted telemetry data can represent virtually any information collected on the client device. For example, the telemetry data can represent how often and at what times specific applications are used, what drivers are installed on the client device, etc.

Method 200 continues at block 208, where the enclave executable 119 processes the multiple instances of telemetry data to obtain a perturbed aggregate. For example, the differential privacy code 117 can perform various mathematical and/or machine learning calculations to obtain the perturbed aggregate. Generally speaking, the perturbed aggregate provides some information derived from the telemetry data without revealing an exact answer, as discussed more below.

Method 200 continues at block 210, where the enclave executable 119 releases the perturbed aggregate from the secure enclave 116. This can take place in various fashions, but the basic idea is that the differential privacy code 117 can request that the perturbed aggregate is output from the secure enclave to another entity outside of the secure enclave 116. The other entity can be another (e.g., unsecure) process executing on the same device as the secure enclave 116, a remote device accessible via network(s) 160, etc. The other entity cannot derive the actual private telemetry values provided by the client devices 120 and/or 130, because these are only available in the secure enclave. However, the other entity nevertheless obtains useful information, as discussed more herein.

Method 200 continues at block 212, where the secure enclave 116 is closed, e.g., a process running the enclave executable 119 can be terminated. For example, the differential privacy code 117 may request that the secure enclave be closed down by the enclave code 118. The enclave code can close the secure enclave by executing machine instructions that cause removal of the enclave executable from the secure enclave. In addition, when the secure enclave is closed down, any internal data is permanently removed from the secure memory region, including the private key, the unencrypted telemetry data, and any unperturbed aggregates or other intermediate computations, without these values being persisted to storage. As a consequence, privacy is preserved for the users that provided the telemetry data to the differential privacy code.

Note that the public key 314 provided with the certificate at block 204 can be used in several ways. In some implementations, the client device(s) 120 and/or 130 use the public key direct to encrypt their telemetry data. In other implementations, the client devices might use the public key to establish a shared symmetric key with the secure enclave 116, and then use the shared symmetric key to encrypt the telemetry data. In this case, the shared symmetric key can also be used within the secure enclave to decrypt the telemetry data.

Perturbed Aggregates

For the purposes of this document, the term "aggregate" can refer to any result computed over multiple instances of data. For example, in some cases, the aggregate might be a statistical value, e.g., the aggregate might reflect the average amount of time each user has a browser application open each day, the average number of browsing tabs used by the users during a day, the percentage of users who have installed a particular driver, etc. In other cases, the aggregate might be provided as an output of a machine learning model trained using the telemetry data. In still further cases, the aggregate can be provided as trained parameters of a machine learning model.

In the case of a statistical aggregate, one way to perturb the aggregate is to add statistical noise. For example, the telemetry data may indicate whether users have a specific operating system service pack installed on their respective client devices. At block 210 of method 200, the differential privacy code 117 may first calculate the actual percentage of users that have the service pack installed, e.g., 74.6%. However, the differential privacy code might slightly perturb this number, e.g., to 73.7%, before releasing the aggregate from the secure enclave. The differential privacy code can do so by adding random noise from a statistical distribution (e.g., Laplacian, Gaussian, etc.) to the actual percentage. The added noise protects the privacy of the users, but still provides useful information, because knowing that roughly 73.7% of users have the service pack installed is not so different from the actual figure of 74.6%.

As noted, in some cases the telemetry data can be used to obtain a trained machine learning model, e.g., using a machine learning algorithm. For example, the differential privacy code 117 can use the telemetry data to train a neural network, support vector machine, genetic algorithm, Bayesian net, and/or various other types of machine learning algorithms. In this case, the differential privacy code can perturb the training of the machine learning algorithm. For example, training a neural network involves updating various weights as learning proceeds on the telemetry data, and noise can be added to individual weights of the neural network during training. As a consequence, the neural network may not provide exactly the same responses to all queries as would be the case had the noise not been added, and this can prevent adversaries from learning the telemetry data used to train the neural network. Nevertheless, assuming the noise added during training is not excessive, the neural network can still produce useful outputs for most queries.

Thus, as used herein, the term "perturbed aggregate" can refer to the result obtained by performing differential privacy processing within a secure enclave. Generally, releasing a perturbed aggregate from a secure enclave preserves privacy via the addition of noise within the secure enclave. For example, a noisy statistical value can be output from the secure enclave. Alternatively, a machine learning model can be trained by adding noise within the secure enclave, and the entire trained machine learning model can be output from the secure enclave. In other cases, the trained machine learning model is run within the secure enclave, receives various queries, and outputs of the trained machine learning model are released from the secure enclave.

Code Verification

Note that the aforementioned method has the following security properties. None of the untrusted telemetry processing code 114, the operating system 115, or any other entity outside of the secure enclave 116 can learn the actual telemetry values communicated by the client devices 120 and 130, because these values are encrypted until being decrypted within the secure enclave. The encryption key used to encrypt the telemetry data can be securely communicated from the telemetry data processing device 110 to the client devices by implementing a secure communication algorithm within the secure enclave. For example, the enclave executable 119 may set up Transport Layer Security ("TLS") connections to communicate the encryption key to the client devices. Because the encryption key is encrypted by the TLS code executing within the secure enclave, any untrusted code on the telemetry data processing device cannot read the encryption key from memory, from the network card, etc. Moreover, any other device that obtains the encrypted TLS communications from network 160 will likewise be unable to determine the encryption key.

Furthermore, none of the untrusted telemetry processing code 114, the operating system 115, or other entities can learn any unperturbed aggregate or other intermediate value (e.g., neural network weights) computed by the differential privacy code 117. The differential privacy code does not output this information outside of the secure enclave 116. Furthermore, the unperturbed aggregate, any intermediate values, the private key, and the unencrypted telemetry values are all permanently removed from the secure memory region when the secure enclave is shut down. Thus, any untrusted entity can only learn the perturbed aggregate, along with any other information that the differential privacy code and/or the client device(s) choose to intentionally share outside of the secure enclave.

However, also note that the users of the client devices 120 and/or 130 do not necessarily trust the entity that executes the enclave executable 119. For example, suppose a malicious entity writes the differential privacy code so as to consistently perturb the aggregate in a known way, thus allowing the malicious entity to recover the actual telemetry inputs from the perturbed output. Or, more blatantly, suppose the malicious entity simply writes the differential privacy code to periodically send the unencrypted actual telemetry values to another device, without the user's knowledge.

These concerns can be addressed by having the verification device 150 and/or a human verify the functionality of the differential privacy code 117, enclave code 118, and/or enclave executable 119. For example, the verification module 151 can obtain a copy of the enclave executable and analyze and/or observe execution of the enclave executable. In addition, the verification module can also obtain source or binary versions of the differential privacy code and/or enclave code for individual analysis. The verification module can also publish a report stating how the enclave executable actually functions, e.g., by stating what aggregate (s) the differential privacy code generates, confirming that the differential privacy code releases only perturbed aggregates instead of unperturbed aggregates, etc. The verification module can also confirm other aspects of the enclave executable, e.g., that sensitive data are deleted from the secure memory region whenever the secure enclave 116 is terminated. The verification module can include this information in the report. The verification module can also calculate a hash of the enclave executable, and provide that hash to the client devices with the report.

Given the above, a user that considers sharing their telemetry data with the differential privacy code 117 can be assured that their telemetry values will be handled in a secure fashion. Specifically, the user's client device 120 and/or 130 can receive a request for the telemetry data from the telemetry data processing device 110. The enclave executable 119 can provide a digital certificate with the request that includes a hash of the enclave executable. The client device(s) can provide the digital certificate to the attestation device 140, which can either confirm or deny the validity of the digital certificate. The client device(s) can also confirm that the hash calculated by the verification service matches the hash included in the digital certificate. This allows the client device(s) to confirm that the enclave executable is the same code referenced in the report produced by the verification device 150.

If the digital certificate is valid, then the attestation device 140 will confirm this to the client device 120 and/or 130, and the client device can proceed with encrypting and sharing telemetry data with the telemetry data processing device 110. This is because the validation by the attestation device confirms that the enclave executable 119 in the secure enclave 116 is the same code that was verified by the verification device 150 and is executing in a valid secure enclave. As a consequence, the user can be confident that the enclave executable will comply with the security properties published by the verification device, including that the enclave executable does not release unperturbed aggregates and permanently deletes data such as the private key, the unencrypted telemetry data, any unperturbed aggregate, and/or any other intermediate computation results present in the secure memory region. This prevents adversaries from learning information that might otherwise reveal additional information about the user's private telemetry data.

Example Data Flow

Figure 3:
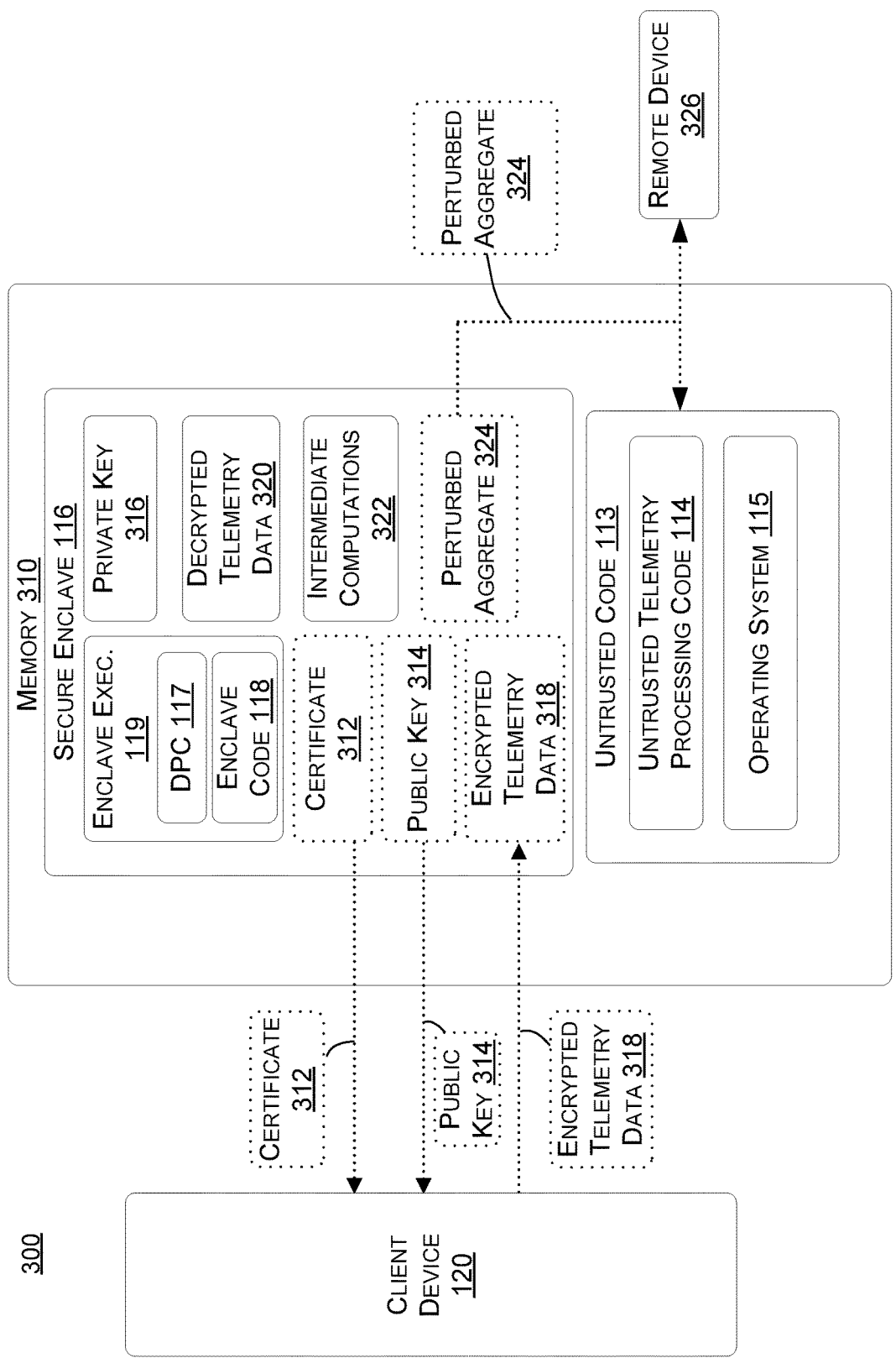
FIGS. 3, 5, 7, and 9 illustrate example data flow diagrams, consistent with some implementations of the present concepts.

FIG. 3 includes a data flow diagram 300 showing how data flows within environment 100 when method 200 is performed. As shown in FIG. 3, the storage resources 112 of the telemetry data processing device 110 can include a memory 310. Memory 310 can include a secure memory region for the secure enclave 116 and also other memory regions for the untrusted code 113, including untrusted telemetry processing code 114, operating system 115, etc. In some cases, the other memory regions are not protected in the same way as the secure memory region, e.g., may use an unencrypted bus, may not be tamper-resistant, etc.

Generally, FIG. 3 shows data items in secure enclave 116 in dotted lines if those data items are accessible outside of the secure enclave at any point. In contrast, data items are shown in solid lines if those data items are not released from the secure enclave. Thus, because all data is removed from the secure memory region of memory 310 when the secure enclave is closed down, the data items shown in solid lines are not accessible to entities outside of the secure enclave. Also, note that code such as differential privacy code 117, enclave code 118, and enclave executable 119 are also shown in solid lines.

Consider, for example, certificate 312. As noted above, the enclave code 118 can generate the certificate when the secure enclave 116 is created or when requested by the differential privacy code 117, and the certificate can be sent to the client device 120 (and/or client device 130, not shown in FIG. 3). Likewise, the enclave code can generate a public key 314 that is also sent to the client devices 120 and/or 130, separately or as part of the certificate. In contrast, the enclave code can also generate a corresponding private key 316 that remains in the secure enclave. As a consequence, even if an entity is able to obtain a copy of encrypted telemetry data 318 (e.g., by sniffing on network(s) 160), that entity will not be able to obtain the private key and thus will not be able to determine the actual private telemetry values submitted to the differential privacy code.

Note also that decrypted telemetry data 320 and intermediate computations 322 (e.g., unperturbed aggregates, unperturbed machine learning weights, etc.) are also not released from the secure enclave 116. On the other hand, perturbed aggregate 324 is released from the secure enclave 116, e.g., by sending the perturbed aggregate to a remote device 326 and/or transferring the perturbed aggregate to an unprotected memory region accessible to the untrusted telemetry processing code 114 and/or operating system 115.

Second Method

In the aforementioned examples, the user was given some guarantee of privacy by virtue of the differential privacy code 117 only releasing a single perturbed aggregate. Because only a single aggregate was computed within the secure enclave 116 before the private data therein was deleted, it is relatively simple to confirm that the user's privacy was not being violated. However, consider a circumstance where an entity wishes to issue a series of queries over data. In this case, the differential privacy code might be able to handle multiple different types of queries, e.g., queries constrained to specific locations, by specific demographic traits of the users, etc. By performing targeted queries in a specific order, such an entity might be able to learn the telemetry inputs of one or more users even if the differential privacy code only releases perturbed aggregates in response to the queries.

The following implementations extend the ideas discussed above to address this problem. The basic idea is that the differential privacy code 117 stores encrypted telemetry records on persistent storage, and can perform different queries over time on the telemetry data stored on the persistent storage. Prior to performing the first query, the differential privacy code can establish a privacy budget and can update the privacy budget an appropriate amount before performing another query. Once the privacy budget is expended, the differential privacy code can cease processing further queries.

Figure 4:
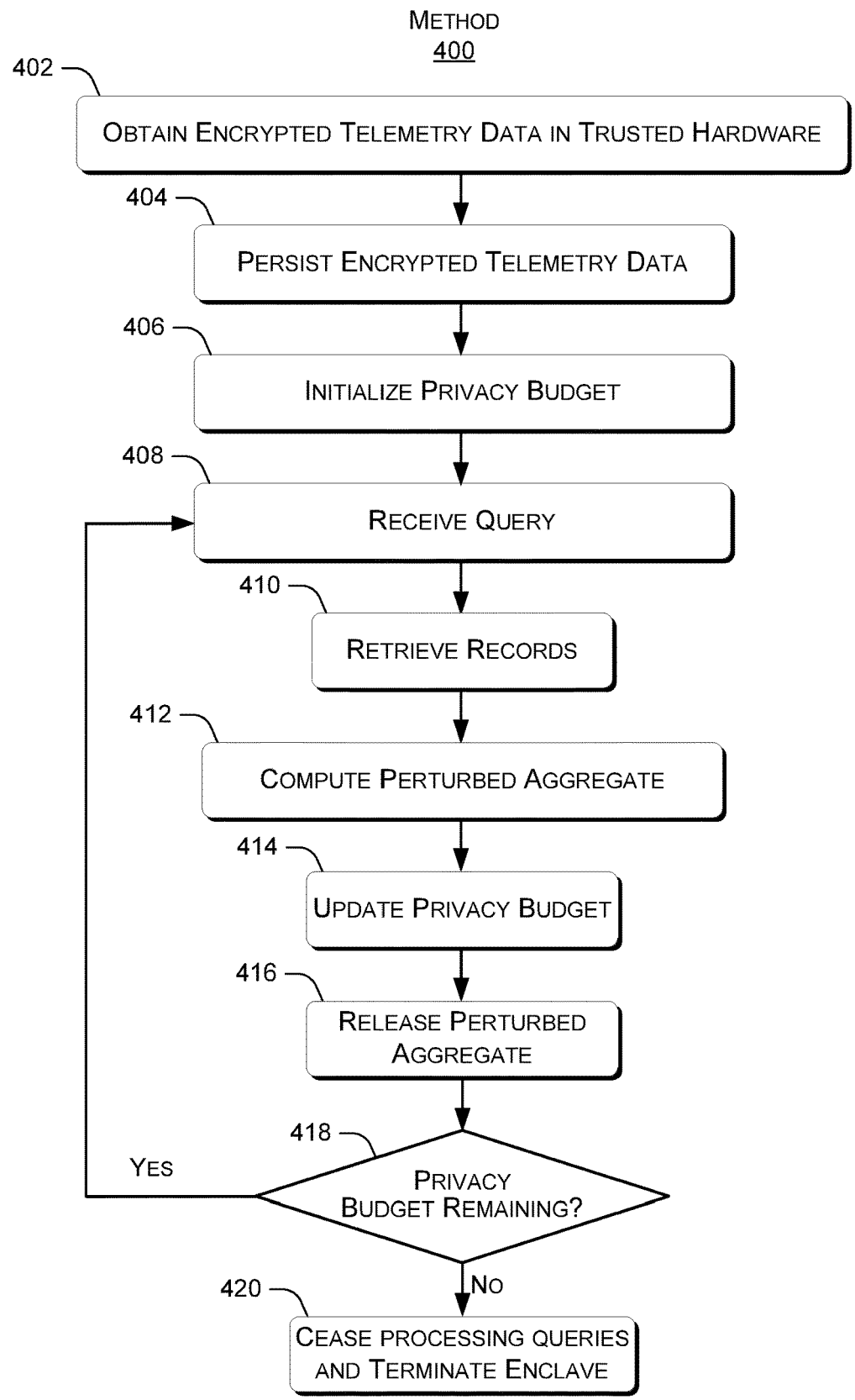

FIG. 4 illustrates an example method 400 suitable for processing telemetry data with a privacy budget. Certain processing involved in method 400 can be performed in a manner similar to that discussed above with respect to method 200, as discussed more below.

Method 400 begins at block 402, where encrypted telemetry data is obtained within trusted hardware. For example, the secure enclave 116 can be established with a secure memory region, a certificate can be provided to the client devices, a public key can be provided to the client devices in the certificate, telemetry data can be received in encrypted form from the client devices, etc. Generally speaking, the processing performed in block 402 can include any of the analogous processing discussed above with respect to method 200 or elsewhere herein.

Method 400 continues at block 404, where the encrypted telemetry data is persisted, e.g., by writing the encrypted telemetry data to a persistent storage device. In some cases, the telemetry data can be encrypted with the same public key shared with the client devices, although it is also possible to generate other symmetric or asymmetric keys for encrypting the telemetry data.

Method 400 continues at block 406, where a privacy budget is initialized. For example, the differential privacy code 117 can determine that this is the first iteration of the method and initialize the privacy budget to a known value. Privacy budgets are discussed in more detail below, but for the following purposes the privacy budget can be considered simply as a number.

Method 400 continues at block 408, where a query is received. For example, the untrusted telemetry processing code 114 may request that the differential privacy code 117 perform a specific query, which involves computing a specific aggregate.

Method 400 continues at block 410, where encrypted telemetry data records are retrieved from the persistent storage and decrypted within the secure enclave 116. For example, the differential privacy code 117 can identify which records should be retrieved and decrypted, e.g., by calling the enclave code 118 to retrieve and decrypt the encrypted records. In some cases, the records that are retrieved may only be a subset of the records that are responsive to the query. However, in further implementations, the differential privacy code and/or enclave code may take steps to conceal which records are actually retrieved, e.g., by retrieving all records even if only some are requested by the query, by retrieving records in random order, or randomly retrieving at least some records not requested by the query, etc. If the records were encrypted with the public key provided to the client device(s) in the digital certificate, the private key associated with the public key can be used to decrypt the encrypted records.

Method 400 continues at block 412, where a perturbed aggregate responsive to the current query is computed. As noted above, the perturbed aggregate can be obtained by computing a statistical value and then adding noise to the computed value, by adding noise during training of a machine learning algorithm, by adding noise to the telemetry values before the aggregate is computed, etc.

Method 400 continues at block 414, where the privacy budget is updated. For example, the differential privacy code 117 can decrement the privacy budget a specified amount, depending on the specific query that has been provided and/or the specific aggregate that has been computed.

Method 400 continues at block 416, where the perturbed aggregate is released. Again, this can involve transferring the perturbed aggregate outside of the secure enclave 116 to a remote device, or to any other location in memory and/or persistent storage on the telemetry data processing device 110.

Method 400 continues at decision block 418, where the remaining privacy budget is evaluated. For example, if the differential privacy code 117 determines there is remaining privacy budget for handling other queries, the method returns to block 408, where additional queries are received and processed.

If there is insufficient remaining privacy budget to handle further queries, the method moves to block 420. For example, the differential privacy code 117 can make a call to the enclave code 118 indicating that the secure enclave 116 should be terminated. At this point, the enclave is terminated, all data stored therein is removed from the trusted memory region, and no further queries are processed.

Note that method 400 involves persisting encrypted telemetry data. In some cases, the enclave executable 119 can delete the encrypted telemetry data records prior to terminating the secure enclave 116. However, even assuming the secure enclave were to crash before these records are deleted, the encryption key that can decrypt the records is stored only in the trusted memory region and will be deleted from the trusted memory region in the event of such a crash.

Example Privacy Budget Queries

The following discusses how multiple different queries specifying different aggregates can be processed using multiple iterations through method 400 to obtain different perturbed aggregates. The following is a relatively simple example that assumes each query has a privacy cost of 1, and the privacy budget is initialized to a value of 3. Further, assume that query processing will cease and the secure enclave 116 will be closed when the privacy budget reaches a value of 0.

Assume the first iteration through method 400 involves a first query requesting the percentage of users who have installed a specific service pack on their device. First, the differential privacy code 117 can decrement the privacy budget to 2, and then compute the specific percentage of all users who have a given service pack installed on their device is 74.6%. Also, assume that the perturbed aggregate in this case is 73.7%, which can be released from the secure enclave 116.

Now, assume a second query is received that requests the percentage of users in Maryland who have the service pack installed. Further, assume that the precise answer is 87.4%. The differential privacy code 117 can perturb the answer, e.g., to 87.9%, and release the aggregate, updating the privacy budget to 1.

Now, assume a third query is received that requests the percentage of users in Montana who have the service pack installed. Further, assume that the precise answer is 56.2%. The differential privacy code 117 can perturb the answer, e.g., to 57.1%, release the perturbed aggregate, and update the privacy budget to 1.

Now, assume a fourth query is received that requests the percentage of users in Idaho who have the service pack installed. Further, assume that the precise answer is 91.8%. The differential privacy code 117 can perturb the answer, e.g., to 92.1%, release the perturbed aggregate, and update the privacy budget to 0. At this time, the method moves to block 420, the secure enclave 116 is disabled and no further queries are processed.

In the above example, each query used the same amount of the privacy budget. However, in further examples, different queries might have different privacy costs, e.g., some queries might have a privacy cost of 3, others of only 1. In this case, method 400 can include an additional check between block 408 and block 410 to confirm that the privacy cost of the current query does not exceed the privacy budget. If not, then the method can continue as discussed previously. Otherwise, the method can return back to block 408 until a new query is received that can be accommodated by the remaining privacy budget.

One specific algorithm for differential privacy processing with a privacy budget involves using the Private Multiplicative Weight (PMW) update mechanism. The PMW update mechanism generally works by maintaining a "synthetic" database. When a query is received, this algorithm computes answers based on both synthetic and real databases. If the answers are close enough, the algorithm responds based on the synthetic database. If the answers are relatively far apart, the algorithm updates the synthetic database so that answers become closer and responds based on the updated synthetic database. The privacy budget is updated each time the synthetic database is updated, but is not changed for queries that do not require updates to the synthetic database. This allows the privacy budget to be used for more queries than would typically be the case when every query has a privacy cost.

Example Data Flow

Figure 5:
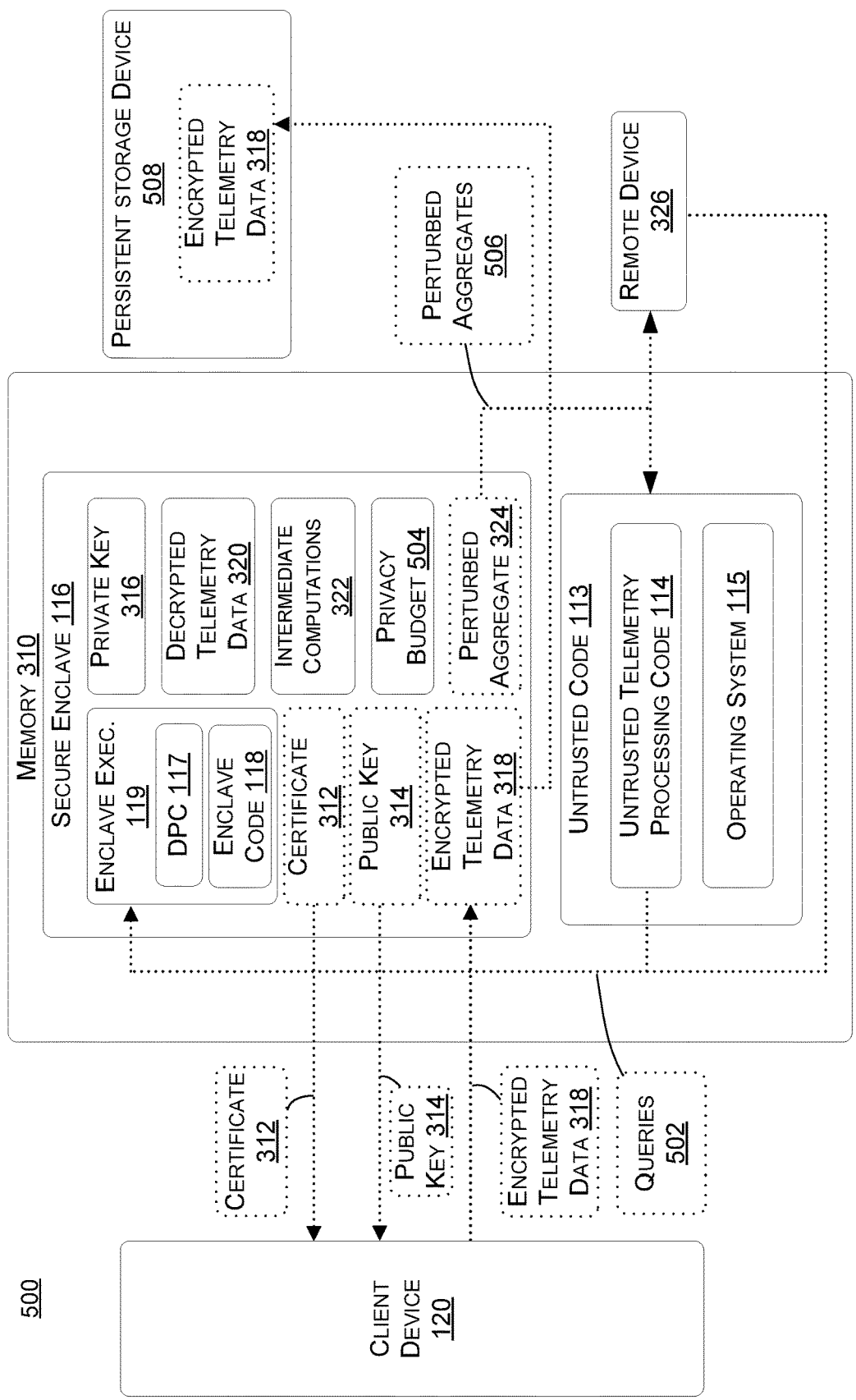

FIG. 5 includes a data flow diagram 500 showing how data flows within environment 100 when method 400 is performed. Generally, data flow diagram 500 is similar to data flow diagram 300 shown in FIG. 3, with some additions. Specifically, data flow diagram 500 introduces queries 502 and privacy budget 504, as discussed more below, and perturbed aggregates 506 replace the singular perturbed aggregate 324. Also, data flow diagram 500 introduces persistent storage device 508.

Note that queries 502 are provided from entities external to the secure enclave 116, e.g., untrusted telemetry processing code 114 and/or remote device 326. The basic idea here is that the differential privacy code 117 has the flexibility to perform multiple different types of queries on the decrypted telemetry data 320. This allows the external entities to request different information from the differential privacy code over time. For example, assume that each month an external entity queries the differential privacy code to determine the percentage of users who have a particular service pack installed. Further, assume that one month the percentage increases sharply. The external entity can issue further queries, e.g., to determine whether there was a specific week during that month when most of the users installed the service pack. In this example, the queries 502 could include both monthly queries and weekly queries for the specific month when the sharp increase occurred. The perturbed aggregates 506 could include the responses, which would include perturbed values each month and also perturbed values for the weeks within the specific month when the number of users changed drastically.

Note also that the privacy budget 504 is retained within the secure enclave 116. This has security implications, because attackers could otherwise manipulate the privacy budget so that the differential privacy code 117 would continue responding to queries when the privacy budget should have been fully expended. This could allow those attackers to learn the individual telemetry values of certain users.

Also, note that the encrypted telemetry data 318 can be stored on persistent storage device 508. This can be useful for various reasons, e.g., there may be a very large number of records that do not all fit into the secure memory region of the secure enclave 116.

Third Method

In the techniques described previously, a single secure enclave was provided and performed processing for one or more queries. When the telemetry data was available outside of the secure enclave 116, the telemetry data was encrypted and the only copy of the decryption key was within the secure enclave. Moreover, the trusted memory region, including the decryption key, was deleted when the secure enclave closes or crashes.

However, note that the privacy budget 504 is also maintained within the secure enclave 116 in the previous implementations. Thus, in the event of a crash, there is no way to know how much privacy budget is remaining if the secure enclave is restarted to answer more queries. To preserve privacy, the safest assumption is that there is no remaining privacy budget, and in this case further queries should not be processed.

One mitigating approach that can be employed is to use multiple redundant instances of secure enclave 116. Each instance of the secure enclave can have a corresponding instance of the enclave executable 119. The privacy budget 504 can be divided equally among the different secure enclaves into different portions. Each secure enclave instance can process different queries and terminate when the portion of the privacy budget for that enclave is expended. Thus, even if one of the secure enclave instances crashes, the other instances can carry on with their processing and the only consequence is the loss of the privacy budget for the instance that crashed. This means that somewhat less information can be extracted by queries, but at least provides some measure of protection rather than simply losing all of the privacy budget with one crash.

Another approach is to have the differential privacy code 117 persist the privacy budget 504 on persistent storage. Then, even if the secure enclave 116 crashes, a new secure enclave can be created and can retrieve the last value of the privacy budget and proceed with processing further queries. This would allow for recovery from crashed enclaves while still providing a mechanism for tracking the privacy budget across multiple enclave instances. The privacy budget could also be encrypted before being stored on persistent storage.

While this approach prevents attackers from learning the privacy budget, the attackers can perform attacks where they replace the current encrypted value of the privacy budget on the persistent storage with an older value. Without further protection, the differential privacy code cannot ensure that the encrypted privacy budget it retrieves from persistent storage is actually the most recent version of the privacy budget. The following approach, broadly, introduces the idea of using a trusted counter to track freshness of the privacy budget, as discussed more below.

Figure 6:
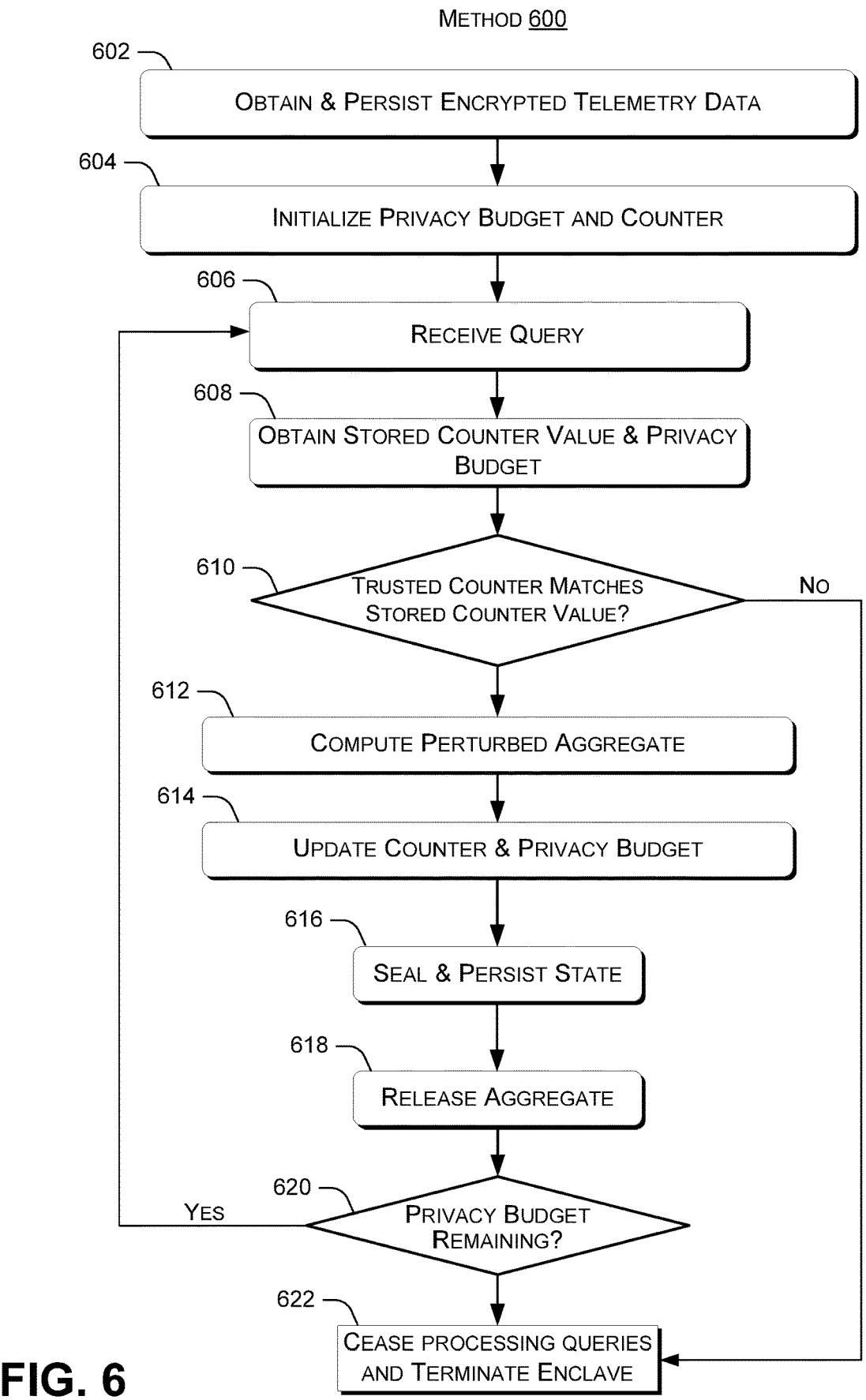

FIG. 6 illustrates an example method 600 that uses a trusted counter to prevent the aforementioned attacks. Certain processing involved in method 600 can be similar to method 200 and/or 400, as discussed more below.

Method 600 begins at block 602, where encrypted telemetry data is obtained and persisted. For example, as noted above, the secure enclave 116 can be established within a secure region of memory 310, a certificate can be provided to the client devices, public keys can be provided to the client devices, telemetry data can be received in encrypted form from the client devices, the encrypted telemetry data can be written to a persistent storage device, etc. Generally speaking, the processing performed in block 402 can include any of the analogous processing discussed above with respect to method 200, method 400, or elsewhere herein.

Method 600 continues at block 604, where a privacy budget and a counter are initialized. For example, the counter can be a trusted monotonic counter initialized to 0, and the privacy budget can be initialized to a number.

Method 600 continues at block 606, where a query is received. For example, the untrusted telemetry processing code 114 may request that the differential privacy code 117 perform a specific query, which involves computing a specific perturbed aggregate.

Method 600 continues at block 608, where stored values of the counter and privacy budget are obtained. In the first iteration of method 600, this step can be trivial, as the values are simply the initialized values obtained at block 604. In subsequent iterations of the method, these values can be obtained using an unsealing mechanism provided the processing resources 111(1), as discussed more below.

Method 600 continues at decision block 610, where the stored value of the trusted counter is compared to a current value of the trusted counter. If the values do not match, the method continues to block 622 where the secure enclave 116 is terminated and no further queries are processed.

If the counter values match, then the privacy budget has not been tampered with and the method 600 continues to block 612 for further processing. In block 612, a perturbed aggregate is computed, as discussed elsewhere herein.

Method 600 continues at block 614, where the trusted counter and privacy budget are updated. For example, the trusted counter can be incremented and the privacy budget can be updated as discussed elsewhere herein.

Method 600 continues at block 616, where state data is sealed and persisted. For example, the updated privacy budget, the current value of the trusted counter, and the decryption key for the telemetry data can be sealed by the processing resources 111(1), e.g., on persistent storage in a message.

Method 600 continues at block 618, where the perturbed aggregate is released, e.g., by sending the perturbed aggregate outside of the secure enclave 116 to an entity that submitted the most recent query. In some implementations, the perturbed aggregate is not released until confirmation is received that the sealed message has been successfully persisted, as discussed more below.

Method 600 continues at block 620, where the privacy budget is checked. If privacy budget remains, the method continues back to block 606 to process further queries. Otherwise, the method moves to block 622 where the secure enclave 116 is terminated and no further queries are processed.

Note that the secure enclave 116 can crash at any point during method 600 and can simply restart at block 606. As discussed more below, the trusted counter can ensure that the secure enclave does not repeatedly crash and restart with older values of the privacy budget. Rather, the counter is used to ensure that the privacy budget has not been manipulated while the secure enclave is offline.

Sealing Functionality

In some implementations, the processing resources 111(1) can provide data sealing and unsealing functionality for the secure enclave 116. The processing resources can seal any message received from the enclave executable 119, encrypt the message with a private key, and later provide the message to another secure enclave under certain conditions. For example, each time a new secure enclave is started, the enclave executable can request any sealed messages. The processing resources can confirm that the request is received from a valid secure enclave, that the secure enclave is executing on the same device on which the sealed message was created, and that the enclave executable is identical to the enclave executable that created the sealed message (e.g., a hash of the current executable matches a hash taken from the executable that sealed the message). If so, the processing resources can decrypt the message and provide the message to the enclave executable within the new secure enclave.

Note that the sealing key used by the processing resources 111(1) is not necessarily the same key that the enclave executable 119 uses to encrypt telemetry data records. In some cases, the sealing key is a permanent, secret key stored within secure hardware of the processing resources. The sealing and unsealing functionality can be implemented using microcode of the processing resources. One specific example of a technology that provides secure enclaves, data sealing and unsealing functionality, and attestation functionality as discussed herein is Intel® SGX.

Trusted Counters

Further, in some implementations, the processing resources 111(1) of the telemetry data processing device 110 provide hardware support for trusted monotonic counters. For example, the processing resources can ensure that (1) the trusted monotonic counter can only be incremented, and (2) that only a specific process, e.g., within a secure enclave 116, can increment the counter. In some cases, trusted monotonic counters can be provided by processing resources implementing Intel® SGX functionality.

In other implementations, the trusted monotonic counter can be provided by a designated remote server. In still further implementations, a distributed group of secure enclaves 116 (e.g., on different machines) can cooperatively maintain the value of a single counter. The basic idea is that any enclave can request that the counter be incremented, and the other enclaves in the group store the incremented value. If an enclave halts and then restarts, the restarting enclave then requests that the other enclaves in the group provide the current value to the restarting enclave. The restarting enclave can then confirm the counter value obtained from the other enclaves matches the counter value that was stored with the most recent privacy budget before responding to more queries. In some implementations, a quorum (e.g., a majority or other specified minimum number) of enclaves in the group must agree to increment the counter when requested, or else the enclaves do not increment the counter.

Example Queries with Counter Values

Assume the first iteration through method 600 involves the trusted counter being set to 0 at block 604, and incremented to 1 the first time through block 614. Further, assume the privacy budget is initialized to a value of 3 in the first iteration, and decremented to a value of 2 the first time through block 614. Thus, the first time the method reaches block 616, these values, along with the decryption key for the encrypted telemetry data records, can be sealed as a first message for any subsequent instance of the secure enclave 116 executing on the same machine with the same code.

The second iteration through method 600 involves retrieving the first sealed message into the secure enclave 116. This can be performed by the same instance of the secure enclave or, if the secure enclave crashed or was intentionally halted after sealing the message, by a new instance of the secure enclave. Assuming an adversary has not meddled with the first sealed message, the enclave executable 119 will obtain the value of 1 for the stored counter value and 2 for the current privacy budget, along with the correct decryption key for the telemetry data. Then, at decision block 610, the differential privacy code 117 can read the trusted counter for a current value and compare the current value this to the stored value of the counter, which at this point is 1. Since only the enclave executable within the secure enclave can increment the trusted counter and no adversary has meddled with the first sealed message, the values should match and method 600 can complete the second iteration, e.g., update the counter and privacy budget and release the perturbed aggregate. Assume that this time the trusted counter is incremented to a value of 2, the privacy budget is decremented to a value of 1, and the differential privacy code seals a second message with these values and the decryption key.

The third iteration through method 600 involves reading the sealed message again after receiving the third query. This time, assume an adversary has obtained the first sealed message, and provided the first sealed message to the enclave executable 119 instead of the second sealed message. Then, at block 610, the differential privacy code 117 will obtain the value of 1 for the stored counter value and 2 for the stored privacy budget. Next, the differential privacy code can read the current value of the trusted counter. Since no other entity can modify the trusted counter, the differential privacy code will read a value of 2 from the trusted counter. Since this does not match the stored counter value of 1 in the first sealed message, the differential privacy code can detect that the privacy budget is not correct. At this time, the method moves to block 622, and the secure enclave 116 can be shut down without processing further queries.

Third Example Data Flow

Figure 7:
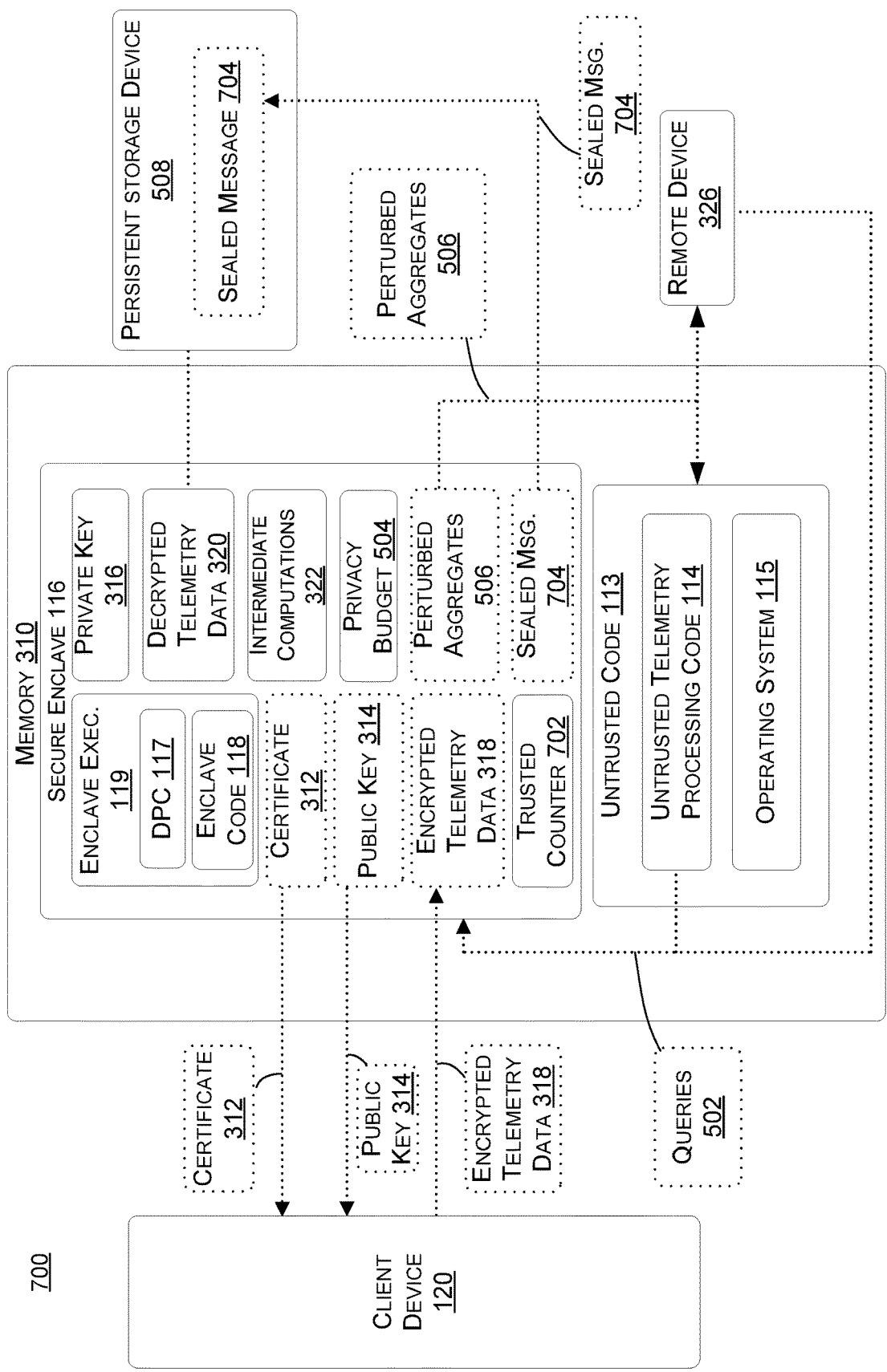

FIG. 7 includes a data flow diagram 700 showing how data flows within environment 100 when method 600 is performed. Generally, data flow diagram 700 is similar to data flow diagram 500 shown in FIG. 5, with some additions. Specifically, data flow diagram 700 introduces trusted counter 702 and sealed message 704.

Trusted counter 702 can be a value that can only be modified by the enclave executable 119 in the secure enclave 116. For example, processing resources 111 may provide access to a trusted counter that can only be modified by the secure enclave. In some cases, the trusted counter only increases monotonically, e.g., the value can never be decreased, even by the secure enclave.

As noted above, the differential privacy code 117 can update both the trusted counter 702 and the privacy budget 504. Then, the updated privacy budget, the updated trusted counter value, and the decryption key for the telemetry data can be sealed in a sealed message 704 that is stored on the persistent storage device 508. Once the sealed message has been confirmed as written on the persistent storage device, then the differential privacy code releases the perturbed aggregate for the current query. In some cases, the differential privacy code "blocks," e.g., the thread or process running the differential privacy code pauses while waiting for confirmation from the processing resources 111(1) and/or persistent storage device that the sealed message has been successfully persisted. Also, in some cases, the trusted counter may be read by other processes outside of the secure enclave 116, but only code within the secure enclave can update the trusted counter.

As can be seen in FIG. 7, the sealed message 704 is only available in encrypted form outside of the secure enclave 116. When the secure enclave restarts, the differential privacy code 117 reads the trusted counter 702 and confirms that the value matches what is retrieved from the most recent sealed message before continuing with further processing. As noted above, if the value of the trusted counter in the sealed message does not match the current value of the trusted counter, the differential privacy code disables the secure enclave and ceases query processing. Because the sealed message includes both the privacy budget 504 and the trusted counter value, an adversary cannot simply replace only the privacy budget in the sealed message with a stale version of the privacy budget. Rather, the adversary must replace the entire sealed message, including the counter value, and this will result in an inconsistency between the actual value of the trusted counter and the value the enclave executable 119 reads from the sealed message.

Fourth Method

The aforementioned techniques can be extended to provide additional auditability. The basic idea is to use a ledger to record certain values that can be verified, e.g., by the verification device 150. The ledger can be used to confirm that the digital privacy code 117 has not changed or, if it has changed, to provide a versioning record for the differential privacy code. In some cases, the ledger can also be used to record additional information, such as the privacy budget, trusted counter values, any queries performed on the telemetry data and/or perturbed aggregates released from the secure enclave 116, etc.

Figure 8:
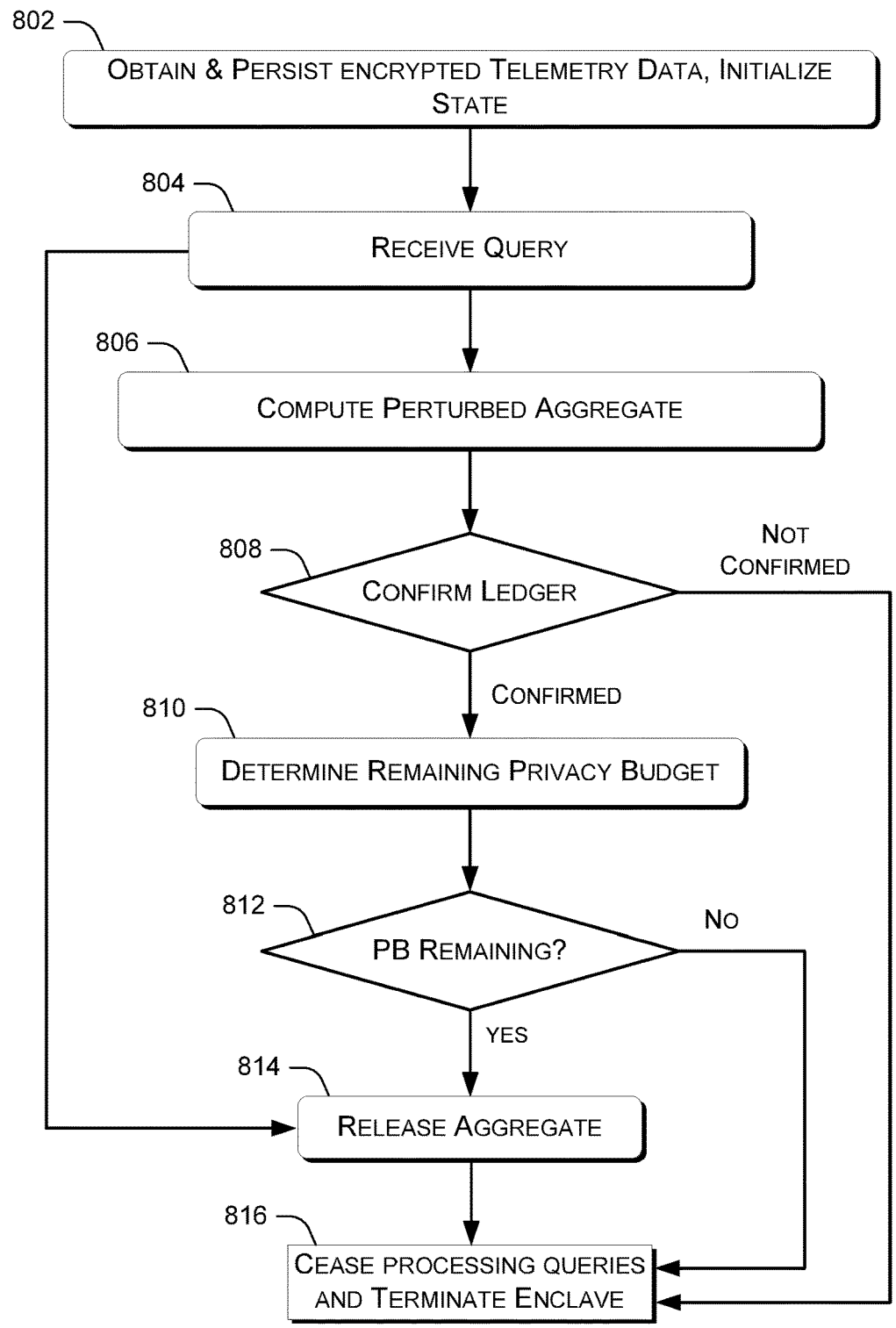

FIG. 8 illustrates an example method 800 that uses a ledger to enhance auditability of the enclave executable 119, and in particular differential privacy code 117. Certain processing involved in method 800 can be similar to method 200, 400, and/or 600 as discussed more below.

Method 800 begins at block 802, where encrypted telemetry data is obtained and persisted, and state is initialized. For example, as noted above, the secure enclave 116 can be established within a secure region of memory 310, a certificate can be provided to the client devices, a public key can be provided to the client devices, telemetry data can be received in encrypted form from the client devices, the encrypted telemetry data can be written to a persistent storage device, etc. State such as a privacy budget or any other state-tracking mechanisms can also be initialized. Generally speaking, the processing performed in block 802 can include any of the analogous processing discussed above with respect to method 200, method 400, method 600, or elsewhere herein.

Method 800 continues at block 804, where a query is received. For example, the untrusted telemetry processing code 114 may request that the differential privacy code 117 perform a specific query, which involves computing a specific aggregate.

Method 800 continues at block 806, where a perturbed aggregate is computed. In some cases, a random number can be computed as well, for reasons discussed further below.

Method 800 continues at decision block 808, where the state of a ledger is confirmed. For example, the ledger may be an append-only ledger such that one cannot retroactively modify existing ledger entries without detection. One way for the differential privacy code 117 verify the ledger state is to write the random number and an encrypted perturbed aggregate in a new ledger entry. Then, the differential privacy code can retrieve the current state of the ledger and confirm that both the random number and encrypted perturbed aggregate are present in the most recent ledger entry. If these values are present, then the differential privacy code can confirm that it has the entire, up-to-date ledger. If these values are not present, then the method continues to block 816, where the secure enclave 116 is terminated by the differential privacy code and no further queries are processed.

If the ledger state is confirmed at decision block 808, then the method continues to block 810 for further processing. In block 810, the differential privacy code 117 determines the remaining privacy budget. In some cases, this can be determined by iterating through the ledger, identifying which queries have already been performed on the telemetry data, and decrementing the initial privacy budget for each query in the ledger.

Method 800 continues at decision block 812, where the differential privacy code 117 determines whether the privacy budget has been expended. If so, the method moves to block 816, where the secure enclave 116 is terminated by request of the differential privacy code and no further queries are processed.

If there is privacy budget remaining at decision block 812, method 800 continues at block 814, where the perturbed aggregate is released outside of the secure enclave 116. At this point, processing returns to block 804, where another query is received.

Fourth Example Data Flow

Figure 9:
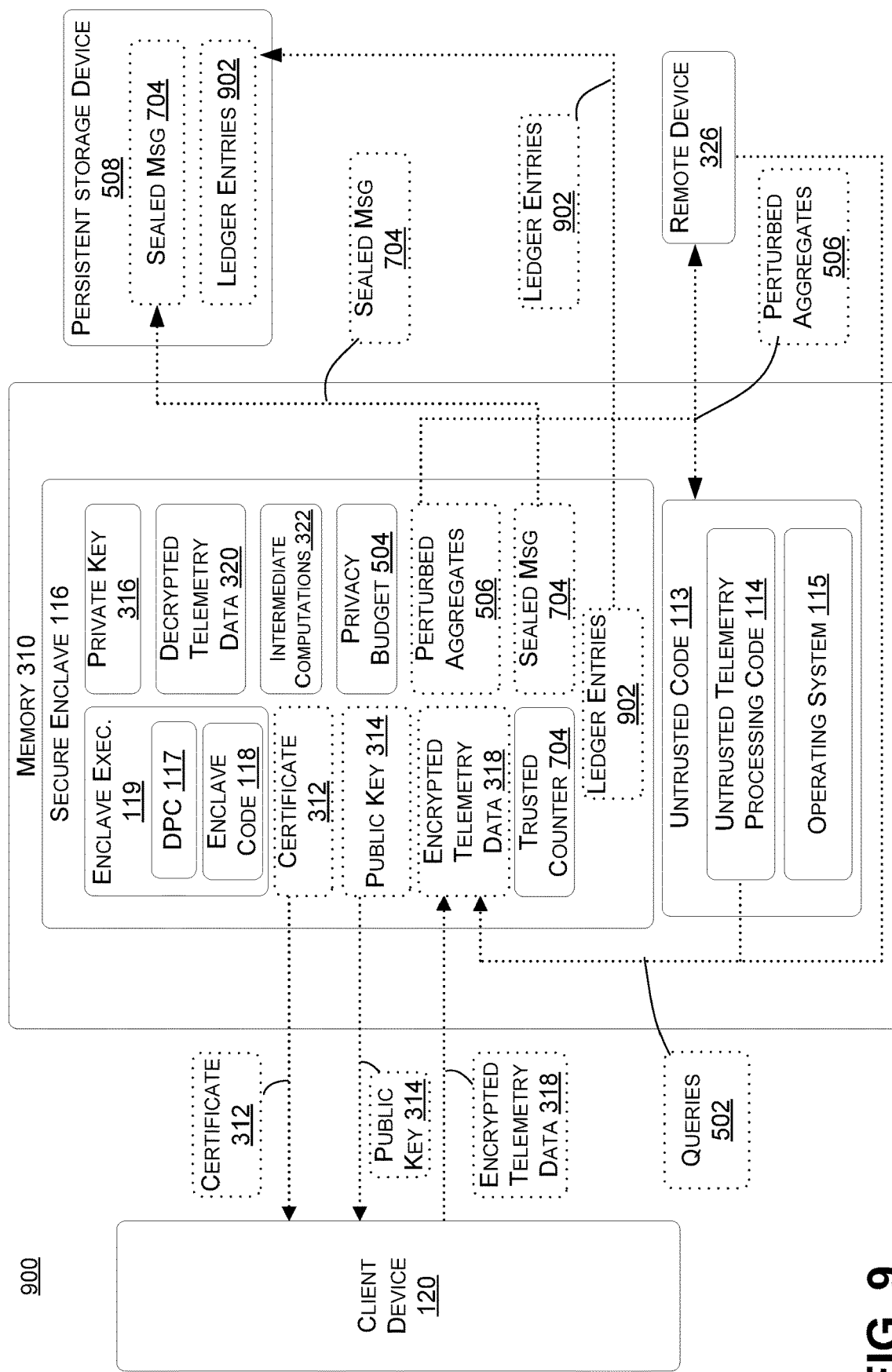

FIG. 9 includes a data flow diagram 900 showing how data flows within environment 100 when method 800 is performed. Generally, data flow diagram 900 is similar to data flow diagram 700 shown in FIG. 7, with the addition of ledger entries 902.

As noted above, the differential privacy code 117 can create ledger entries 902 before releasing any perturbed aggregates. As noted above, the ledger entries can include perturbed aggregates along with random numbers, which can be used to confirm integrity of the entire ledger. In some implementations, the ledger entries also include a cryptographic hash of the differential privacy code 117. Thus, if the differential privacy code changes, the cryptographic hash in the ledger entries will also change. Generally, the cryptographic hash can have a "one-way" property that allows the hash value to be calculated from the input, e.g., the differential privacy code, but it is computationally infeasible to determine any other input that would produce the same hash value.

Thus, an entity such as verification device 150 that wishes to validate one or more executions of the differential privacy code 117 can proceed as follows. First, obtain a copy of the differential privacy code, and confirm the differential privacy code possesses any desired privacy properties mentioned elsewhere herein (e.g., correctly uses a privacy budget, correctly perturbs aggregates, does not release intermediate computations or telemetry inputs, etc.). Next, confirm that the differential privacy code correctly generates ledger entries 902.

At a later time, the verification device 150 can obtain the ledger for verification. First, the verification device can calculate a hash of the differential privacy code 117 that was evaluated by the verification device. Next, the verification device can compare this hash to the value in a given ledger entry. If the values match, the ledger entry was calculated by the differential privacy code that the verification service evaluated previously. Otherwise, different code generated the ledger entry.

Note that, in some cases, the differential privacy code 117 might be modified over time, and, as a consequence, the hash values in the ledger might change. This is not necessarily problematic, as long as the verification device 150 confirms that each version of the differential privacy code possesses the desired privacy properties.

In further implementations, the ledger entries also identify specific queries that were processed by the differential privacy code 117 and/or specific perturbed results released by the differential privacy code. These results can be verified in a manner similar to that discussed above for the differential privacy code.

Also, as noted above, some implementations may update the privacy budget 504 by iterating through the ledger and decrementing the initial privacy budget based on the previous queries that the ledger indicates have been performed. This approach can be used instead of a trusted counter to ensure that the privacy budget has not been manipulated by an adversary. In further implementations, the differential privacy code 117 can seal a checkpoint that maps a specific privacy budget value to a corresponding ledger entry. This can allow the differential privacy code to, upon restarting, unseal the checkpoint and start calculating the current privacy budget from the most recent checkpointed ledger entry, rather than iterating through the entire ledger each time a new query is received. In some implementations, the sealed message also includes a decryption key suitable for decrypting the encrypted telemetry data.

In some implementations, the ledger is an append-only, tamper-resistant blockchain data structure. Each block contains a hash of the previous block in the ledger, as well as any other information mentioned above, e.g., a hash of the differential privacy code 117, an indication of which queries were processed and/or perturbed results were released from the secure enclave 116, etc. In some cases, the verification device 150 can maintain the blockchain ledger and provide confirmation that the differential privacy code is properly writing to the ledger. In further implementations, a distributed group of nodes (e.g., secure enclaves on different machines) can collectively maintain the blockchain and only update the blockchain when a specified minimum number of nodes agree to do so.

Example Graphical User Interface

Some implementations may allow users to select different privacy levels for their data. For example, FIG. 10 shows a privacy configuration GUI 1000 that can be displayed on client device 120 and/or 130 to allow users to specify different privacy levels for different types of telemetry data. The privacy configuration GUI includes telemetry data type 1002 and privacy level 1004. Generally, the user can select one of four privacy levels—low, medium, high, and unshared, for each type of telemetry data.

In FIG. 10, the user has selected low privacy for their service pack data, medium privacy for their installed drivers, memory utilization, and processor utilization, high privacy for their browser application usage, and unshared for their email application usage. The basic idea here is that the user's data can be processed with a relatively small privacy budget for the telemetry data assigned high privacy, moderate privacy budget for the telemetry data assigned medium privacy, and a relatively large (potentially unbounded) privacy budget for the telemetry data assigned low privacy. The client devices 120 and/or 130 can be configured to not report any telemetry data for the email application usage, since this is unshared.

Example Data Sets

FIG. 11 shows example service pack data table 1100, with fields including a record number 1102, service pack installed 1104, privacy level 1106, and perturbed aggregate 1108. The record number field simply identifies the corresponding record in the data table. The service pack installed field indicates whether a particular service pack is installed on the corresponding client device. The privacy level field indicates what privacy level the user has chosen for their service pack telemetry data. The perturbed aggregate indicates the value computed by the differential privacy code for the data set. Here, 50% of the users have installed the service pack, and the perturbed value is 52.4%. Note that in some cases, only the perturbed value is released from the secure enclave 116, and not other fields from the service pack data table 1100.

In some cases, the differential privacy code 117 can calculate different perturbed aggregates 1108 for different subsets of users, e.g., in separate secure enclaves 116 with different privacy budgets 504. FIG. 12 shows example service pack data table 1200, which helps illustrate this point. Note that service pack data table 1200 is similar to service pack data table 1100, except that in this case the records are divided into three subsets based on their respective privacy levels. Each subset has 50% of the users with the service pack installed, but the perturbed aggregates 1108 are somewhat different for each subset.

The general idea here is that the differential privacy code 117 generally can add more noise when users request higher privacy levels. Thus, the perturbed aggregates tend to be further away from the true values when the users request higher privacy levels. Note, however, that the noise is added randomly, so this is not necessarily the case.

Applications

As noted above, one broad type of telemetry data relates to configuration and/or usage of computing devices. Thus, for example, an entity that manufactures computing devices or provides software might use various perturbed aggregates to learn trends about how the computers are being used. This can enable such entities to learn whether there are issues with specific hardware or software components, whether their users are diligent about installing software updates, etc.

However, many other types of telemetry data can be processed using the techniques discussed herein. As another example, consider a manufacturer of heavy equipment that is interested in how frequently their equipment is used at different times of the year. This could enable the manufacturer to tailor their business, e.g., by stocking more repair parts during times of the year when the equipment is more heavily used, or by reaching out to owners periodically to remind them of service requirements for the equipment.

Another example of telemetry data could involve any type of sensor, e.g., a temperature sensor, a camera, a microphone, etc. For example, a microphone manufacturer might want to know information about what sensitivity settings a user tends to use at different locations, depending on background noise, etc. A camera manufacturer might be interested to know whether their users tend to manually turn on the camera flash or whether most users tend to use auto-flash. A manufacturer of temperature sensors might want to know whether most users are using the temperature sensor within a specified heat range, to predict what kind of failure rate they might expect in the future.

The above examples are just a few of many different types of telemetry data that can be processed using the disclosed implementations.

Device Implementations

Referring back to FIG. 1, environment 100 as shown includes several devices. In this case, for purposes of explanation, the devices are characterized as telemetry data processing device 110, client device 120, client device 130, attestation device 140, and verification device 150. In this example, the client devices are shown as a smartphone and a tablet. However, other types of devices can serve as client devices, such as laptops, desktop computers, printers, scanners, and/or computing-enabled home appliances. Generally, so long as a device has some computational hardware, the device can act as a client device in accordance with the disclosed implementations.

Telemetry data processing device 110, attestation device 140, and/or verification device 150 can include one or more cloud-based server type devices, although they can also be provided as any of the aforementioned client device types.

Each of these devices can also communicate with a datastore that may be co-located with the device, or located remotely. Of course, not all device implementations can be illustrated and other device implementations should be apparent to the skilled artisan from the description above and below.

The term "device", "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute data in the form of computer-readable instructions to provide functionality. Computer-readable instructions and/or data can be stored on storage, such as storage/memory and or the datastore. The term "equipment" as used herein means any physical mechanism capable of providing telemetry data.

The storage resources 112 can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, including untrusted code 113, untrusted telemetry processing code 114, operating system 115, code provided by secure enclave 116, differential privacy code 117, telemetry data providing module 121, attestation module 141, and/or verification module 151. These modules/code can also be provided in hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods described herein can be performed on a single computing device and/or distributed across multiple computing devices that communicate over network(s) 160. Without limitation, network(s) 160 can include one or more local area networks (LANs), wide area networks (WANs), the Internet, and the like.

Various device examples are described above. Additional examples are described below.

Further Examples

One example includes a method performed on a computing device. The method can comprise obtaining encrypted telemetry data and processing the encrypted telemetry data within a secure enclave to obtain unencrypted telemetry data, processing the unencrypted telemetry data to obtain a perturbed aggregate within the secure enclave, and releasing the perturbed aggregate from the secure enclave.

Another example can include any of the above and/or below examples further comprising determining a privacy budget for processing the unencrypted telemetry data, splitting the privacy budget across multiple secure enclaves into respective privacy budget portions, processing different queries within different secure enclaves and updating the respective privacy budget portions as the different queries are processed, and terminating individual secure enclaves as the respective privacy budget portions are expended.

Another example can include any of the above and/or below examples where the secure enclave comprises a secure memory region.

Another example can include any of the above and/or below examples further comprising receiving multiple different queries specifying different requested aggregates to be computed over the unencrypted telemetry data, processing the unencrypted telemetry data to obtain different perturbed aggregates within the secure enclave, and releasing the different perturbed aggregates from the secure memory region as responses to the multiple different queries.

Another example can include any of the above and/or below examples further comprising initializing a privacy budget for performing the multiple different queries, updating the privacy budget as individual queries are processed, confirming that the updated privacy budget is sufficient for subsequent queries before releasing perturbed aggregates in response to the subsequent queries, and disabling the secure enclave once the privacy budget is expended.

Another example can include any of the above and/or below examples where disabling the secure enclave causes deletion, from the secure memory region, of the unencrypted telemetry data and at least one decryption key used to decrypt the encrypted telemetry data.

Another example can include any of the above and/or below examples further comprising storing the encrypted telemetry data on a persistent storage device and, as the individual queries are received, retrieving the encrypted telemetry data from the persistent storage device and processing the individual queries.

Another example can include any of the above and/or below examples further comprising sealing a message that has an updated value of the privacy budget reflecting processing of a previous query.

Another example can include any of the above and/or below examples further comprising obtaining a trusted counter value from a trusted counter, the trusted counter being a trusted hardware counter or maintained by a distributed set of secure enclaves, updating the trusted counter value when the privacy budget is updated, sealing the trusted counter value in the message with the updated value of the privacy budget, upon receiving the subsequent query, unsealing the message, and confirming that a stored trusted counter value in the unsealed message matches a current value of the trusted counter before releasing a response to the subsequent query.

Another example can include any of the above and/or below examples further comprising processing the multiple instances of unencrypted telemetry data using verified differential privacy code that adds noise to a computed aggregate to obtain the perturbed aggregate and, as the verified differential privacy code processes the individual queries, adding ledger entries to a ledger, individual ledger entries comprising a cryptographic hash of the verified differential privacy code.

Another example can include any of the above and/or below examples further comprising adding, to the individual ledger entries, identifiers of the individual queries that have been processed by the verified differential privacy code.

Various device examples are described above. Additional examples are described below. One example includes a system comprising a hardware processing unit. The example also includes storage resources including a memory device, the storage resources storing computer-readable instructions which, when executed by the hardware processing unit, cause the hardware processing unit to: request allocation of a secure enclave comprising a secure memory region on the memory device, load an enclave executable into the secure memory region, the enclave executable comprising differential privacy code, securely process multiple instances of telemetry data in the secure enclave using the differential privacy code to obtain a result, and release the result from the secure enclave.

Another example can include any of the above and/or below examples where the computer-readable instructions, when executed by the hardware processing unit, cause the hardware processing unit to cause the enclave executable to perform an attestation process with at least one client device that provides an individual instance of telemetry data to the secure enclave.

Another example can include any of the above and/or below examples where the attestation process comprises obtaining a certificate from an attestation service confirming validity of the secure enclave and content of the differential privacy code executing within the secure enclave and presenting the certificate to the at least one client device.

Another example can include any of the above and/or below examples where the computer-readable instructions, when executed by the hardware processing unit, cause the hardware processing unit to cause the enclave executable to generate an encryption key and provide the encryption key to the at least one client device, the at least one client device using the encryption key to encrypt the instance of telemetry data to obtain encrypted telemetry data and provide the encrypted telemetry data to the secure enclave.

Another example can include any of the above and/or below examples where the encryption key comprises a public encryption key corresponding to a private key maintained within the secure enclave, the enclave executable using the private key to decrypt the encrypted telemetry data.

Another example can include any of the above and/or below examples where the computer-readable instructions, when executed by the hardware processing unit, cause the hardware processing unit to release the result to another process executing on the hardware processing unit outside of the secure enclave.

Various device examples are described above. Additional examples are described below. One example includes a computing device comprising a memory device configured to provide a secure memory region. The example also includes a hardware processing unit configured to process telemetry data within the secure memory region using differential privacy code, the differential privacy code producing a perturbed result, release the perturbed result from the secure memory region to another memory region on the memory device, and cause the telemetry data to be deleted from the secure memory region.

Another example can include any of the above and/or below examples where the differential privacy code is configured to train a machine learning model using the telemetry data, the differential privacy code adding noise as the machine learning model is trained, and release, from the secure memory region, at least one of the trained machine learning model or a result of an operation performed by the trained machine learning model.

Another example can include any of the above and/or below examples where the differential privacy code is configured to compute a statistical aggregate over the telemetry data and add noise to the statistical aggregate to obtain the perturbed result.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method performed on a computing device, the method comprising:
   obtaining encrypted telemetry data and processing the encrypted telemetry data within a secure enclave to obtain unencrypted telemetry data;
   within the secure enclave, processing the unencrypted telemetry data to obtain an unperturbed aggregate;
   within the secure enclave, introducing noise to the unperturbed aggregate to obtain a perturbed aggregate;
   releasing the perturbed aggregate from the secure enclave; and
   permanently removing the unperturbed aggregate from a secure memory region associated with the secure enclave.

2. The method of claim 1, further comprising:
determining a privacy budget for processing the unencrypted telemetry data;
splitting the privacy budget across multiple secure enclaves into respective privacy budget portions;
processing different queries within different secure enclaves and updating the respective privacy budget portions as the different queries are processed; and
terminating individual secure enclaves as the respective privacy budget portions are expended.

3. The method of claim 1, wherein the unperturbed aggregate is computed within the secure enclave before adding the noise within the secure enclave, and the noise is added using a global differential privacy technique.

4. The method of claim 3, further comprising:
receiving multiple different queries specifying different requested aggregates to be computed over the unencrypted telemetry data;
within the secure enclave, processing the unencrypted telemetry data to obtain different perturbed aggregates; and
releasing the different perturbed aggregates from the secure memory region as responses to the multiple different queries.

5. The method of claim 4, further comprising:
initializing a privacy budget for performing the multiple different queries;
updating the privacy budget as individual queries are processed;
confirming that the updated privacy budget is sufficient for subsequent queries before releasing perturbed aggregates in response to the subsequent queries; and
disabling the secure enclave once the privacy budget is expended.

6. The method of claim 5, wherein disabling the secure enclave causes deletion, from the secure memory region, of the unencrypted telemetry data and at least one decryption key used to decrypt the encrypted telemetry data.

7. The method of claim 6, further comprising:
storing the encrypted telemetry data on a persistent storage device; and
as the individual queries are received, retrieving the encrypted telemetry data from the persistent storage device and processing the individual queries.

8. The method of claim 7, further comprising:
sealing a message that has an updated value of the privacy budget reflecting processing of a previous query.

9. The method of claim 8, further comprising:
obtaining a trusted counter value from a trusted counter, the trusted counter being a trusted hardware counter or maintained by a distributed set of secure enclaves;
updating the trusted counter value when the privacy budget is updated;
sealing the trusted counter value in the message with the updated value of the privacy budget;
upon receiving a particular subsequent query, unsealing the message; and
confirming that a stored trusted counter value in the unsealed message matches a current value of the trusted counter before releasing a response to the particular subsequent query.

10. The method of claim 9, further comprising:
processing multiple instances of unencrypted telemetry data using verified differential privacy code that adds noise to a computed aggregate to obtain the perturbed aggregate; and
as the verified differential privacy code processes the individual queries, adding ledger entries to a ledger, individual ledger entries comprising a cryptographic hash of the verified differential privacy code.

11. The method of claim 10, further comprising:
adding, to the individual ledger entries, identifiers of the individual queries that have been processed by the verified differential privacy code.

12. A system comprising:
a hardware processing unit; and
storage resources storing computer-readable instructions which, when executed by the hardware processing unit, cause the hardware processing unit to:
obtain encrypted telemetry data and process the encrypted telemetry data within a secure enclave to obtain unencrypted telemetry data;
within the secure enclave, aggregate the unencrypted telemetry data to obtain an unperturbed aggregate;
within the secure enclave and after aggregating the unencrypted telemetry data, add noise to the unperturbed aggregate to obtain a perturbed aggregate;
release the perturbed aggregate from the secure enclave; and
after releasing the perturbed aggregate, permanently remove the unperturbed aggregate from a secure memory region associated with the secure enclave.

13. The system of claim 12, wherein the computer-readable instructions comprise global differential privacy code that is verified not to reveal the unperturbed aggregate.

14. The system of claim 12, wherein the computer-readable instructions, when executed by the hardware processing unit, cause the hardware processing unit to:
store the encrypted telemetry data on persistent storage;
receive a query;
decrypt a subset of the encrypted telemetry data that is responsive to the query;
compute the unperturbed aggregate from the decrypted subset; and
decrement a privacy budget based at least on the query.

15. The system of claim 14, wherein the computer-readable instructions, when executed by the hardware processing unit, cause the hardware processing unit to:
retrieve the encrypted telemetry data from the persistent storage in random order.

16. The system of claim 14, wherein the computer-readable instructions, when executed by the hardware processing unit, cause the hardware processing unit to:
retrieve at least one encrypted telemetry data record that is not responsive to the query.

17. The system of claim 14, wherein the computer-readable instructions, when executed by the hardware processing unit, cause the hardware processing unit to:
retrieve all of the encrypted telemetry data, including multiple encrypted telemetry data records that are not responsive to the query.

18. The system of claim 14, wherein the computer-readable instructions, when executed by the hardware processing unit, cause the hardware processing unit to:
decrement the privacy budget using a private multiplicative weight mechanism.

19. The system of claim 14, wherein the privacy budget is retained and decremented within the secure enclave.

20. A computer-readable storage medium storing computer-readable instructions which, when executed by a processing device, perform the following acts:

obtaining encrypted telemetry data and processing the encrypted telemetry data within a secure enclave to obtain unencrypted telemetry data;

within the secure enclave, aggregating the unencrypted telemetry data to obtain an unperturbed aggregate;

within the secure enclave and after aggregating the unencrypted telemetry data, adding statistical noise to the aggregate to obtain a perturbed aggregate;

releasing the perturbed aggregate from the secure enclave; and after releasing the perturbed aggregate, permanently removing the unperturbed aggregate from a secure memory region associated with the secure enclave.

\* \* \* \* \*